(12) United States Patent
Veillette

(10) Patent No.: US 8,370,697 B2
(45) Date of Patent: *Feb. 5, 2013

(54) SYSTEM AND METHOD FOR POWER OUTAGE AND RESTORATION NOTIFICATION IN AN ADVANCED METERING INFRASTRUCTURE NETWORK

(75) Inventor: Michel Veillette, Quebec (CA)

(73) Assignee: Trilliant Networks, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,160

(22) Filed: Mar. 16, 2012

(65) Prior Publication Data

US 2012/0179941 A1 Jul. 12, 2012

Related U.S. Application Data

(63) Continuation of application No. 12/275,254, filed on Nov. 21, 2008, now Pat. No. 8,171,364.

(60) Provisional application No. 60/989,957, filed on Nov. 25, 2007, provisional application No. 60/989,967, (Continued)

(51) Int. Cl.
H04L 1/18 (2006.01)
(52) U.S. Cl. .................. 714/748; 714/749; 714/758
(58) Field of Classification Search .............. 714/748, 714/749, 718, 702, 52, 758; 702/188, 65; 709/223, 238
See application file for complete search history.

(56) References Cited

U.S. PATENT DOCUMENTS

| 4,132,981 A | 1/1979 | White ......................... 340/203 |
| 4,190,800 A | 2/1980 | Kelly, Jr. et al. ................ 325/37 |
| 4,204,195 A | 5/1980 | Bogacki ....................... 340/151 |
| 4,254,472 A | 3/1981 | Juengel et al. ................. 364/900 |
| 4,322,842 A | 3/1982 | Martinez ........................ 370/11 |
| 4,396,915 A | 8/1983 | Farnsworth et al. ...... 340/870.03 |
| 4,425,628 A | 1/1984 | Bedard et al. ................. 364/900 |
| 4,638,314 A | 1/1987 | Keller ....................... 340/870.02 |

(Continued)

FOREIGN PATENT DOCUMENTS

EP 0 578 041 B1 11/1999
EP 0 663 746 B1 1/2003
(Continued)

OTHER PUBLICATIONS

International Search Report and Written Opinion for Application No. PCT/US09/05008, dated Oct. 22, 2009, 8 pp.
(Continued)

Primary Examiner — Fritz Alphonse
(74) Attorney, Agent, or Firm — Dawn-Marie Bey; King & Spalding LLP

(57) ABSTRACT

A method and system are provided to transmit a meter power status. The method includes recognizing a power status change at a meter. The method includes, if the meter is scheduled to transmit first, transmitting a notification message to at least one neighboring meter towards a mesh gate, wherein the notification message includes a power status indicator and a meter identifier. The method includes, if the meter is not scheduled to transmit first, waiting a predetermined time period to receive a notification message from at least one neighboring meter. The method includes, responsive to receiving a notification message, adding a meter identifier to the received notification message before retransmitting the modified notification message to at least one neighboring meter. The method includes retransmitting the notification message.

14 Claims, 6 Drawing Sheets

Related U.S. Application Data filed on Nov. 25, 2007, provisional application No. 60/989,958, filed on Nov. 25, 2007, provisional application No. 60/989,964, filed on Nov. 25, 2007, provisional application No. 60/989,950, filed on Nov. 25, 2007, provisional application No. 60/989,953, filed on Nov. 25, 2007, provisional application No. 60/989,956, filed on Nov. 25, 2007, provisional application No. 60/989,975, filed on Nov. 25, 2007, provisional application No. 60/989,959, filed on Nov. 25, 2007, provisional application No. 60/989,961, filed on Nov. 25, 2007, provisional application No. 60/989,962, filed on Nov. 25, 2007, provisional application No. 60/989,951, filed on Nov. 25, 2007, provisional application No. 60/989,955, filed on Nov. 25, 2007, provisional application No. 60/989,952, filed on Nov. 25, 2007, provisional application No. 60/989,954, filed on Nov. 25, 2007, provisional application No. 61/025,285, filed on Jan. 31, 2008, provisional application No. 60/992,312, filed on Dec. 4, 2007, provisional application No. 60/992,313, filed on Dec. 4, 2007, provisional application No. 60/992,315, filed on Dec. 4, 2007, provisional application No. 61/025,279, filed on Jan. 31, 2008, provisional application No. 61/025,270, filed on Jan. 31, 2008, provisional application No. 61/025,276, filed on Jan. 31, 2008, provisional application No. 61/025,282, filed on Jan. 31, 2008, provisional application No. 61/025,271, filed on Jan. 31, 2008, provisional application No. 61/025,287, filed on Jan. 31, 2008, provisional application No. 61/025,278, filed on Jan. 31, 2008, provisional application No. 61/025,273, filed on Jan. 31, 2008, provisional application No. 61/025,277, filed on Jan. 31, 2008, provisional application No. 61/025,285, filed on Jan. 31, 2008, provisional application No. 61/094,116, filed on Sep. 4, 2008.

(56) References Cited

U.S. PATENT DOCUMENTS

| | | | | |
|---|---|---|---|---|
| 4,644,320 A | | 2/1987 | Carr et al. | 340/12.37 |
| 4,749,992 A | | 6/1988 | Fitzemeyer et al. | 340/870.02 |
| 4,792,946 A | | 12/1988 | Mayo | 370/245 |
| 4,939,726 A | | 7/1990 | Flammer et al. | 370/400 |
| 5,007,052 A | | 4/1991 | Flammer | 370/389 |
| 5,056,107 A | | 10/1991 | Johnson et al. | 375/138 |
| 5,077,753 A | | 12/1991 | Grau, Jr. et al. | 375/141 |
| 5,079,768 A | | 1/1992 | Flammer | 370/349 |
| 5,115,433 A | | 5/1992 | Baran et al. | 370/400 |
| 5,117,422 A | | 5/1992 | Hauptschein et al. | 370/255 |
| 5,130,987 A | | 7/1992 | Flammer | 370/436 |
| 5,138,615 A | | 8/1992 | Lamport et al. | 370/94.3 |
| 5,159,592 A | | 10/1992 | Perkins | 370/338 |
| 5,216,623 A | | 6/1993 | Barrett et al. | 364/550 |
| 5,276,680 A | | 1/1994 | Messenger | 370/311 |
| 5,311,581 A | | 5/1994 | Merriam et al. | 379/106.07 |
| 5,400,338 A | | 3/1995 | Flammer, III et al. | 370/255 |
| 5,430,729 A | | 7/1995 | Rahnema | 370/409 |
| 5,432,507 A | | 7/1995 | Mussino et al. | 340/870.03 |
| 5,453,977 A | | 9/1995 | Flammer, III et al. | 370/254 |
| 5,459,727 A | | 10/1995 | Vannucci | 370/332 |
| 5,463,777 A | | 10/1995 | Bialkowski et al. | 1/1 |
| 5,465,398 A | | 11/1995 | Flammer | 455/69 |
| 5,467,345 A | | 11/1995 | Cutter, Jr. et al. | 370/229 |
| 5,471,469 A | | 11/1995 | Flammer, III et al. | 370/346 |
| 5,479,400 A | | 12/1995 | Dilworth et al. | 370/331 |
| 5,488,608 A | | 1/1996 | Flammer, III | 370/400 |
| 5,515,369 A | | 5/1996 | Flammer, III et al. | 370/480 |
| 5,515,509 A | | 5/1996 | Rom | 709/228 |
| 5,528,507 A | | 6/1996 | McNamara et al. | 700/286 |
| 5,544,036 A | | 8/1996 | Brown, Jr. et al. | 364/145 |
| 5,553,094 A | | 9/1996 | Johnson et al. | 375/130 |
| 5,570,084 A | | 10/1996 | Retter et al. | 370/338 |
| 5,572,438 A | * | 11/1996 | Ehlers et al. | 700/295 |
| 5,572,528 A | | 11/1996 | Shuen | 370/402 |
| 5,596,722 A | | 1/1997 | Rahnema | 709/241 |
| 5,608,721 A | | 3/1997 | Natarajan et al. | 370/238 |
| 5,608,780 A | | 3/1997 | Gerszberg et al. | 455/436 |
| 5,623,495 A | | 4/1997 | Eng et al. | 370/397 |
| 5,659,300 A | | 8/1997 | Dresselhuys et al. | 340/870.02 |
| 5,673,252 A | | 9/1997 | Johnson et al. | 370/449 |
| 5,684,710 A | * | 11/1997 | Ehlers et al. | 700/293 |
| 5,696,501 A | | 12/1997 | Ouellette et al. | 340/870.02 |
| 5,696,695 A | * | 12/1997 | Ehlers et al. | 700/286 |
| 5,717,718 A | | 2/1998 | Rowsell et al. | 375/260 |
| 5,719,564 A | | 2/1998 | Sears | 340/870.02 |
| 5,726,644 A | | 3/1998 | Jednacz et al. | 340/825.52 |
| 5,727,057 A | | 3/1998 | Emery et al. | 379/201.07 |
| 5,737,318 A | | 4/1998 | Melnik | 370/254 |
| 5,740,366 A | | 4/1998 | Mahany et al. | 709/227 |
| 5,748,104 A | | 5/1998 | Argyroudis et al. | 340/870.11 |
| 5,757,783 A | | 5/1998 | Eng et al. | 370/315 |
| 5,758,331 A | | 5/1998 | Johnson | 705/412 |
| 5,761,083 A | | 6/1998 | Brown, Jr. et al. | 364/492 |
| 5,767,790 A | | 6/1998 | Jovellana | 340/870.02 |
| 5,774,660 A | | 6/1998 | Brendel et al. | 709/201 |
| 5,812,531 A | | 9/1998 | Cheung et al. | 370/255 |
| 5,822,309 A | | 10/1998 | Ayanoglu et al. | 370/315 |
| 5,844,893 A | | 12/1998 | Gollnick et al. | 370/329 |
| 5,874,903 A | | 2/1999 | Shuey et al. | 340/870.02 |
| 5,880,677 A | | 3/1999 | Lestician | 340/825.06 |
| 5,892,758 A | | 4/1999 | Argyroudis | 370/335 |
| 5,894,422 A | | 4/1999 | Chasek | 364/528.26 |
| 5,896,097 A | | 4/1999 | Cardozo | 340/870.03 |
| 5,896,566 A | | 4/1999 | Averbuch et al. | 455/419 |
| 5,898,387 A | | 4/1999 | Davis et al. | 340/870.02 |
| 5,898,826 A | | 4/1999 | Pierce et al. | 714/4 |
| 5,901,067 A | | 5/1999 | Kao et al. | 700/11 |
| 5,903,566 A | | 5/1999 | Flammer, III | 370/406 |
| 5,914,672 A | | 6/1999 | Glorioso et al. | 340/870.02 |
| 5,914,673 A | | 6/1999 | Jennings et al. | 340/870.03 |
| 5,919,247 A | | 7/1999 | Van Hoff et al. | 709/217 |
| 5,920,697 A | | 7/1999 | Masters et al. | 709/219 |
| 5,926,531 A | | 7/1999 | Petite | 379/144.04 |
| 5,933,092 A | | 8/1999 | Ouellette et al. | 340/870.02 |
| 5,953,371 A | | 9/1999 | Rowsell et al. | 375/220 |
| 5,963,146 A | | 10/1999 | Johnson et al. | 340/870.01 |
| 5,963,457 A | | 10/1999 | Kanoi et al. | 364/528.26 |
| 5,974,236 A | | 10/1999 | Sherman | 709/221 |
| 5,986,574 A | | 11/1999 | Colton | 340/870.02 |
| 5,987,011 A | | 11/1999 | Toh | 370/331 |
| 5,991,806 A | | 11/1999 | McHann, Jr. | 709/224 |
| 6,014,089 A | | 1/2000 | Tracy et al. | 340/870.02 |
| 6,018,659 A | | 1/2000 | Ayyagari et al. | 455/431 |
| 6,026,133 A | | 2/2000 | Sokoler | 375/365 |
| 6,028,522 A | | 2/2000 | Petite | 340/641 |
| 6,044,062 A | | 3/2000 | Brownrigg et al. | 370/238 |
| 6,058,355 A | | 5/2000 | Ahmed et al. | 702/62 |
| 6,061,609 A | | 5/2000 | Kanoi et al. | 700/291 |
| 6,073,169 A | | 6/2000 | Shuey et al. | 709/217 |
| 6,075,777 A | | 6/2000 | Agrawal et al. | 370/329 |
| 6,078,785 A | | 6/2000 | Bush | 455/7 |
| 6,084,867 A | | 7/2000 | Meier | 370/338 |
| 6,088,659 A | | 7/2000 | Kelley et al. | 702/62 |
| 6,097,703 A | | 8/2000 | Larsen et al. | 370/254 |
| 6,108,699 A | | 8/2000 | Moiin | 709/221 |
| 6,118,269 A | | 9/2000 | Davis | 324/110 |
| 6,122,603 A | | 9/2000 | Budike, Jr. | 702/182 |
| 6,124,806 A | | 9/2000 | Cunningham et al. | 340/870.02 |
| 6,134,587 A | | 10/2000 | Okanoue | 709/222 |
| 6,137,423 A | | 10/2000 | Glorioso et al. | 340/870.02 |
| 6,150,955 A | | 11/2000 | Tracy et al. | 340/870.02 |
| 6,169,979 B1 | | 1/2001 | Johnson | 705/412 |
| 6,172,616 B1 | | 1/2001 | Johnson et al. | 340/870.12 |
| 6,195,018 B1 | | 2/2001 | Ragle et al. | 340/870.01 |
| 6,218,953 B1 | | 4/2001 | Petite | 340/641 |
| 6,233,327 B1 | | 5/2001 | Petite | 379/155 |
| 6,239,722 B1 | | 5/2001 | Colten et al. | 340/870.02 |
| 6,240,080 B1 | | 5/2001 | Okanoue et al. | 370/338 |

| Patent | Date | Inventor | Class |
|---|---|---|---|
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | 375/146 |
| 6,606,708 B1 | 8/2003 | Devine et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B1 | 1/2004 | Nierlich et al. | 700/286 |
| 6,684,245 B1 | 1/2004 | Shuey et al. | 709/223 |
| 6,687,901 B1 | 2/2004 | Imamatsu | 717/173 |
| 6,691,173 B2 | 2/2004 | Morris et al. | 709/249 |
| 6,697,331 B1 | 2/2004 | Riihinen et al. | 700/236 |
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,711,512 B2 | 3/2004 | Noh | 702/65 |
| 6,714,787 B1 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,772,052 B1 | 8/2004 | Amundsen et al. | 700/291 |
| 6,775,258 B1 | 8/2004 | van Valkenburg et al. | 370/338 |
| 6,778,099 B1 | 8/2004 | Mayer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Mawhinney et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,882,635 B2 | 4/2005 | Eitan et al. | 370/338 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/338 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,053,853 B2 | 5/2006 | Merenda et al. | 343/820 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,086 B2 | 9/2006 | Steed et al. | 375/132 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,174,260 B2 * | 2/2007 | Tuff et al. | 702/61 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,230,931 B2 | 6/2007 | Struhsaker | 370/280 |
| 7,231,482 B2 | 6/2007 | Leach | 710/305 |
| 7,245,938 B2 | 7/2007 | Sobczak et al. | 455/562.1 |
| 7,248,181 B2 | 7/2007 | Patterson et al. | 340/870.03 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 | 1/2008 | Wu et al. | 370/238 |
| 7,327,998 B2 | 2/2008 | Kumar et al. | 455/405 |

| Patent No. | Date | Inventor | Class |
|---|---|---|---|
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,366,191 B2 | 4/2008 | Higashiyama | 370/406 |
| 7,379,981 B2 | 5/2008 | Elliott et al. | 709/220 |
| 7,397,907 B2 | 7/2008 | Petite | 379/155 |
| 7,406,298 B2 | 7/2008 | Luglio et al. | 455/90.3 |
| 7,411,964 B2 | 8/2008 | Suemura | 370/400 |
| 7,427,927 B2 | 9/2008 | Borleske et al. | 340/870.02 |
| 7,451,019 B2 | 11/2008 | Rodgers | 700/295 |
| 7,457,273 B2 | 11/2008 | Nakanishi et al. | 370/338 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 | 4/2009 | Ehlers et al. | 705/412 |
| 7,522,540 B1 | 4/2009 | Maufer | 370/254 |
| 7,522,639 B1 | 4/2009 | Katz | 370/503 |
| 7,539,151 B2 | 5/2009 | Demirhan et al. | 370/254 |
| 7,545,285 B2 | 6/2009 | Shuey et al. | 340/870.02 |
| 7,546,595 B1 | 6/2009 | Wickham et al. | 717/168 |
| 7,548,826 B2 | 6/2009 | Witter et al. | 702/115 |
| 7,548,907 B2 | 6/2009 | Wall et al. | 1/1 |
| 7,554,941 B2 | 6/2009 | Ratiu et al. | 370/328 |
| 7,562,024 B2 | 7/2009 | Brooks et al. | 705/1.1 |
| 7,571,865 B2 | 8/2009 | Nicodem et al. | 236/51 |
| 7,586,420 B2 | 9/2009 | Fischer et al. | 340/635 |
| 7,599,665 B2 | 10/2009 | Sinivaara | 455/67.16 |
| 7,602,747 B2 | 10/2009 | Maksymczuk et al. | 370/331 |
| 7,609,673 B2 | 10/2009 | Bergenlid et al. | 370/329 |
| 7,613,147 B2 | 11/2009 | Bergenlid et al. | 370/329 |
| 7,623,043 B2 | 11/2009 | Mizra et al. | 340/870.02 |
| 7,626,967 B2 | 12/2009 | Yarvis et al. | 370/338 |
| 7,650,425 B2 | 1/2010 | Davis et al. | 709/238 |
| 7,676,231 B2 | 3/2010 | Demirhan et al. | 455/452.1 |
| 7,680,041 B2 | 3/2010 | Johansen | 370/230 |
| 7,729,496 B2 | 6/2010 | Hacigumus | 380/277 |
| 7,733,224 B2 | 6/2010 | Tran | 340/540 |
| 7,743,224 B2 | 6/2010 | Wang | 711/154 |
| 7,756,538 B2 | 7/2010 | Bonta et al. | 455/517 |
| 7,788,491 B1 | 8/2010 | Dawson | 713/168 |
| 7,802,245 B2 | 9/2010 | Sonnier et al. | 717/171 |
| 7,814,322 B2 | 10/2010 | Gurevich et al. | 713/171 |
| 7,818,758 B2 | 10/2010 | de Bonet et al. | 719/328 |
| 7,847,706 B1 | 12/2010 | Ross et al. | 340/12.52 |
| 8,051,415 B2 | 11/2011 | Suzuki | 717/168 |
| 2001/0005368 A1 | 6/2001 | Rune | 370/390 |
| 2001/0010032 A1* | 7/2001 | Ehlers et al. | 702/62 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0013679 A1 | 1/2002 | Petite | 702/188 |
| 2002/0031101 A1 | 3/2002 | Petite et al. | 370/310 |
| 2002/0051269 A1 | 5/2002 | Margalit et al. | 398/126 |
| 2002/0066095 A1 | 5/2002 | Yu | 717/173 |
| 2002/0110118 A1 | 8/2002 | Foley | 370/352 |
| 2002/0114303 A1 | 8/2002 | Crosbie et al. | 370/338 |
| 2002/0120569 A1 | 8/2002 | Day | 705/40 |
| 2002/0174354 A1 | 11/2002 | Bel et al. | 713/193 |
| 2002/0186619 A1 | 12/2002 | Reeves et al. | 368/47 |
| 2003/0001640 A1 | 1/2003 | Lao et al. | 327/165 |
| 2003/0001754 A1 | 1/2003 | Johnson et al. | 340/870.02 |
| 2003/0014633 A1 | 1/2003 | Gruber | 713/170 |
| 2003/0033394 A1 | 2/2003 | Stine | 709/222 |
| 2003/0037268 A1 | 2/2003 | Kistler | 713/310 |
| 2003/0050737 A1 | 3/2003 | Osann | 700/276 |
| 2003/0112822 A1 | 6/2003 | Hong et al. | 370/469 |
| 2003/0117966 A1 | 6/2003 | Chen | 370/255 |
| 2003/0122686 A1 | 7/2003 | Ehrke et al. | 340/870.02 |
| 2003/0123481 A1 | 7/2003 | Neale et al. | 370/466 |
| 2003/0156715 A1 | 8/2003 | Reeds, III et al. | 380/37 |
| 2003/0207697 A1 | 11/2003 | Shpak | 455/524 |
| 2003/0229900 A1 | 12/2003 | Reisman | 725/87 |
| 2003/0233201 A1 | 12/2003 | Horst et al. | 702/62 |
| 2004/0008663 A1 | 1/2004 | Srikrishna et al. | 370/351 |
| 2004/0031030 A1 | 2/2004 | Kidder et al. | 717/171 |
| 2004/0034773 A1 | 2/2004 | Balabine et al. | 713/168 |
| 2004/0039817 A1 | 2/2004 | Lee et al. | 709/225 |
| 2004/0056775 A1 | 3/2004 | Crookham et al. | 340/825 |
| 2004/0066310 A1 | 4/2004 | Ehrke et al. | 340/870.02 |
| 2004/0077341 A1 | 4/2004 | Chandranmenon et al. | 455/418 |
| 2004/0081086 A1 | 4/2004 | Hippelainen et al. | 370/227 |
| 2004/0082203 A1 | 4/2004 | Logvinov et al. | 439/10 |
| 2004/0100953 A1 | 5/2004 | Chen et al. | 370/389 |
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0183687 A1 | 9/2004 | Petite et al. | 340/601 |
| 2004/0185845 A1 | 9/2004 | Abhishek et al. | 455/422.1 |
| 2004/0193329 A1 | 9/2004 | Ransom et al. | 700/286 |
| 2004/0210544 A1 | 10/2004 | Shuey et al. | 705/412 |
| 2004/0268142 A1 | 12/2004 | Karjala et al. | 726/15 |
| 2005/0026569 A1 | 2/2005 | Lim et al. | 455/73 |
| 2005/0027859 A1 | 2/2005 | Alvisi et al. | 709/224 |
| 2005/0030968 A1 | 2/2005 | Rich et al. | 370/449 |
| 2005/0033967 A1 | 2/2005 | Morino et al. | 713/182 |
| 2005/0055432 A1 | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0122944 A1 | 6/2005 | Kwon et al. | 370/338 |
| 2005/0136972 A1 | 6/2005 | Smith et al. | 455/554.1 |
| 2005/0172024 A1 | 8/2005 | Cheifot et al. | 709/225 |
| 2005/0187928 A1 | 8/2005 | Byers | 1/1 |
| 2005/0193390 A1 | 9/2005 | Suzuki et al. | 717/178 |
| 2005/0195757 A1 | 9/2005 | Kidder et al. | 370/278 |
| 2005/0201397 A1 | 9/2005 | Petite | 370/401 |
| 2005/0228874 A1 | 10/2005 | Edgett et al. | 709/220 |
| 2005/0243867 A1 | 11/2005 | Petite | 370/474 |
| 2005/0249113 A1 | 11/2005 | Kobayashi et al. | 370/219 |
| 2005/0251403 A1 | 11/2005 | Shuey | 705/1 |
| 2005/0257215 A1 | 11/2005 | Denby et al. | 717/172 |
| 2005/0270173 A1 | 12/2005 | Boaz | 340/870.02 |
| 2005/0276243 A1 | 12/2005 | Sugaya et al. | 370/328 |
| 2005/0286440 A1 | 12/2005 | Strutt et al. | 370/253 |
| 2006/0028355 A1 | 2/2006 | Patterson et al. | 340/870.02 |
| 2006/0055432 A1 | 3/2006 | Shimokawa et al. | 327/5 |
| 2006/0056363 A1 | 3/2006 | Ratiu et al. | 370/338 |
| 2006/0056368 A1 | 3/2006 | Ratiu et al. | 370/254 |
| 2006/0077906 A1 | 4/2006 | Maegawa et al. | 370/254 |
| 2006/0087993 A1 | 4/2006 | Sengupta et al. | 370/310 |
| 2006/0098576 A1 | 5/2006 | Brownrigg et al. | 370/238 |
| 2006/0098604 A1 | 5/2006 | Flammer, III et al. | 370/337 |
| 2006/0111111 A1 | 5/2006 | Ovadia | 455/439 |
| 2006/0130053 A1 | 6/2006 | Buljore et al. | 717/173 |
| 2006/0140135 A1 | 6/2006 | Bonta et al. | 370/254 |
| 2006/0146717 A1 | 7/2006 | Conner et al. | 370/238 |
| 2006/0158347 A1 | 7/2006 | Roche et al. | 340/870.02 |
| 2006/0161310 A1 | 7/2006 | Lal | 700/295 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217936 A1* | 9/2006 | Mason et al. | 702/188 |
| 2006/0230276 A1 | 10/2006 | Nochta | 713/176 |
| 2006/0271244 A1 | 11/2006 | Cumming et al. | 700/291 |
| 2006/0271678 A1 | 11/2006 | Jessup et al. | 709/224 |
| 2007/0001868 A1 | 1/2007 | Boaz | 340/870.02 |
| 2007/0013547 A1 | 1/2007 | Boaz | 340/870.02 |
| 2007/0019598 A1 | 1/2007 | Prehofer | 370/338 |
| 2007/0036353 A1 | 2/2007 | Reznik et al. | 380/30 |
| 2007/0057767 A1 | 3/2007 | Sun et al. | 340/7.35 |
| 2007/0060147 A1 | 3/2007 | Shin et al. | 455/445 |
| 2007/0063866 A1 | 3/2007 | Webb | 340/870.02 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0089110 A1 | 4/2007 | Li | 717/178 |
| 2007/0101442 A1 | 5/2007 | Bondurant | 726/34 |
| 2007/0103324 A1 | 5/2007 | Kosuge et al. | 340/618 |
| 2007/0109121 A1 | 5/2007 | Cohen | 340/539.26 |

| Publication No. | Date | Inventor | Class |
|---|---|---|---|
| 2007/0110024 A1 | 5/2007 | Meier | 370/351 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0174467 A1 | 7/2007 | Ballou, Jr. et al. | 709/227 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.02 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0211636 A1 | 9/2007 | Bellur et al. | 370/238 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0011864 A1 | 1/2008 | Tessier et al. | 236/51 |
| 2008/0018492 A1 | 1/2008 | Ehrke et al. | 340/870.03 |
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike, Jr. | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/512 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0283620 A1 | 11/2008 | Knapp | 236/12.16 |
| 2008/0310311 A1 | 12/2008 | Flammer et al. | 370/238 |
| 2008/0310377 A1 | 12/2008 | Flammer, III et al. | 370/338 |
| 2008/0317047 A1 | 12/2008 | Zeng et al. | 370/401 |
| 2008/0318547 A1 | 12/2008 | Ballou, Jr. et al. | 455/410 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0034432 A1 | 2/2009 | Bonta et al. | 370/255 |
| 2009/0043911 A1 | 2/2009 | Flammer et al. | 709/238 |
| 2009/0046732 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0129575 A1 | 5/2009 | Chakroaborty et al. | 379/201.03 |
| 2009/0132220 A1 | 5/2009 | Chakroborty et al. | 703/13 |
| 2009/0134969 A1 | 5/2009 | Veillette | 340/3.1 |
| 2009/0135677 A1 | 5/2009 | Veillette | 368/47 |
| 2009/0135716 A1 | 5/2009 | Veillette | 370/221 |
| 2009/0135843 A1 | 5/2009 | Veillette | 370/406 |
| 2009/0136042 A1 | 5/2009 | Veillette | 380/279 |
| 2009/0138777 A1 | 5/2009 | Veillette | 714/748 |
| 2009/0161594 A1 | 6/2009 | Zhu et al. | 370/312 |
| 2009/0167547 A1 | 7/2009 | Gilbert | 340/662 |
| 2009/0168846 A1 | 7/2009 | Filippo, III et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0201936 A1 | 8/2009 | Dumet et al. | 370/401 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | van Greunen et al. | 370/410 |
| 2009/0262642 A1 | 10/2009 | van Greunen et al. | 370/216 |
| 2009/0267792 A1 | 10/2009 | Crichlow | 340/870.02 |
| 2009/0285124 A1 | 11/2009 | Aguirre et al. | 370/255 |
| 2009/0303972 A1 | 12/2009 | Flammer, III et al. | 370/338 |
| 2009/0310593 A1 | 12/2009 | Sheynblat et al. | 370/350 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | van Greunen et al. | 370/350 |
| 2010/0060259 A1 | 3/2010 | Vaswani et al. | 324/86 |
| 2010/0061272 A1 | 3/2010 | Veillette | 370/254 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |
| 2010/0138660 A1 | 6/2010 | Haynes et al. | 713/171 |
| 2010/0238917 A1 | 9/2010 | Silverman et al. | 370/350 |
| 2011/0066297 A1 | 3/2011 | Saberi et al. | 700/287 |

FOREIGN PATENT DOCUMENTS

| | | |
|---|---|---|
| EP | 0 812 502 B1 | 8/2004 |
| EP | 0 740 873 B1 | 12/2005 |
| JP | 10-070774 | 3/1998 |
| JP | 10-135965 | 5/1998 |
| WO | WO 95/12942 | 5/1995 |
| WO | WO 96/10307 | 4/1996 |
| WO | WO 96/10307 A1 | 4/1996 |
| WO | WO 00/54237 | 9/2000 |
| WO | WO 01/26334 A2 | 4/2001 |
| WO | WO 01/55865 A1 | 8/2001 |
| WO | WO 03/015452 | 2/2003 |
| WO | WO 2005/091303 | 9/2005 |
| WO | WO 2006/059195 | 6/2006 |

| WO | WO 2007/015822 | 8/2007 |
| WO | WO 2007/132473 | 11/2007 |
| WO | WO 2008/027457 | 3/2008 |
| WO | WO 2008/033287 A2 | 3/2008 |
| WO | WO 2008/033514 A2 | 3/2008 |
| WO | WO 2008/038072 | 4/2008 |
| WO | WO 2008/092268 A1 | 8/2008 |
| WO | WO 2009/067251 | 5/2009 |

OTHER PUBLICATIONS

Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987).

Nachum Shacham & Janet D. Tornow, Future Directions in Packet Radio Technology, Proc. of the IEEE Infocom 1985 at 93 (Mar. 1985), 17 pp.

John Jubin & Janet D. Tornow, The DARPA Packet Radio Network Protocols, Proc. of the IEEE, vol. 75, No. 1 at 21 (Jan. 1987).

John Jubin, Current Packet Radio Network Protocols, Proc. of the IEEE Infocom1985 at 86 (Mar. 1985), 9 pp.

David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), 18 pp.

David B. Johnson, Mobile Host Internetworking Using IP Loose Source Routing, Carnegie Mellon University CMU-CS-93-128, DARPA Order No. 7330 (Feb. 1993), 18 pp.

Daniel M. Frank, Transmission of IP Datagrams Over NET/ROM Networks, Proc. of the ARRL 7th Computer Networking Conference 1988 at 65 (Oct. 1988), 6 pp.

Robert E. Kahn, et al., Advances in Packet Radio Technology, Proc. of the IEEE, vol. 66, No. 11, pp. 1468-1496 (Nov. 1978).

Clifford A. Lynch & Edwin B. Brownrigg, Packet Radio Networks, Bergamon Press, 259-74 (1987).

Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), 11 pp.

William MacGregor, Jil Westcott, & Michael Beeler, Multiple Control Stations in Packet Radio Networks, 1982 IEEE Military Communications Conference, vol. 3 at 10.3-1 (Oct. 1982), 6 pp.

Nachum Shacham & Jil Westcott, Future Directions in Packet Radio Architectures and Protocols, Proc. of the IEEE, vol. 75, No. 1 at 83 (Jan. 1987) 17 pp.

David B. Johnson and David A. Maltz, Protocols for Adaptive Wireless and Mobile Networking, IEEE Personal Communications, Feb. 1996, p. 34-42.

Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.

David A. Beyer, Accomplishments of the DARPA SURAN Program, IEEE MILCOM 1990, p. 39.6.1-8.

William S. Hortos, Application of Neural Networks to the Dynamic Spatial Distribution of Nodes within an Urban Wireless Network, SPIE, vol. 2492, p. 58-70, 1995.

Nachum Shacham and Richard G. Ogier, Network Control and Data Transport for C3I Applications, IEEE 1987, p. 30.5.1-6.

John E. Rustad, Reidar Skaug, and Andreas Aasen, New Radio Networks for Tactical Communication, IEEE Jornal on Selected Areas in Communications, vol. 8, No. 5, p. 713-27, Jun. 1990.

Barry M. Leiner, Donald L. Nielson, and Fouad A. Tobagi, Issues in Packet Radio Network Design, Proceedings of the IEEE, vol. 75, No. 1, p. 6-20, Jan. 1987.

Janet Tornow, Functional Summary of the DARPA SURAP1 Network, DARPA, Sep. 1986, 17 pp.

John F. Shoch and Lawrence Stewart, Interconnecting Local Networks via the Packet Radio Network, Sixth Data Communications Symposium, Nov. 1979, pp. 153-158.

J.R. Cleveland, Performance and Design Considerations for Mobile Mesh Networks, IEEE MILCOM 96, vol. 1, p. 245-49.

Cmdr. R. E. Bruninga, USN, A Worldwide Packet Radio Network, Signal, vol. 42, No. 10, p. 221-230, Jun. 1988.

Nachum Shacham and Janet Tornow, Packet Radio Networking, Telecommunications, vol. 20, No. 9, p. 42-48, 64, 82, Sep. 1986.

Spencer T. Carlisle, Edison's NetComm Project, IEEE 1989, Paper No. 89CH2709-4-B5, p. B5-1-B5-4.

Brian H. Davies and T.R. Davies, The Application of Packet Switching Techniques to Combat Net Radio, Proceedings of the IEEE, vol. 75, No. 1, p. 43-55, Jan. 1987.

Fouad A. Tobagi, Richard Binder, and Barry Leiner, Packet Radio and Satellite Networks, IEEE Communications Magazine, vol. 22, No. 11, p. 24-40, Nov. 1984.

M. Scott Corson, Joseph Macker, and Stephen G. Batsell, Architectural Considerations for Mobile Mesh Networking, IEEE MILCOM 96, vol. 1, p. 225-9.

K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.

J. Jonquin Garcia-Luna-Aceves, A Fail-Safe Routing Algorithm for Multihop Packet-Radio Networks, IEEE INFOCOM '86, p. 434-43, Apr. 8-10, 1986.

Johanes P. Tamtomo, A Prototype of TCP/IP-Based Internet-PRNET for Land Information Networks and Services, Department of Surveying Engineering, University of New Brunswick, Jan. 25, 1993, 118 pp.

A. Alwan, et al., Adaptive Mobile Multimedia Networks, IEEE Personal Communications, p. 34-51, Apr. 1996.

Michael Ball, et al., *Reliability of Packet Switching Broadcast Radio Networks,* IEEE Transactions on Circuits and Systems, vol. Cas-23, No. 12, p. 806-13 ,Dec. 1976.

Kenneth Brayer, Implementation and Performance of Survivable Computer Communication with Autonomous Decentralized Control, IEEE Communications Magazine, p. 34-41, Jul. 1983.

Weidong Chen and Eric Lin, *Route Optimization and Locations Updates for Mobile Hosts,* Proceedings of the 16th ICDCS, p. 319-326, 1996.

Daniel Cohen, Jonathan B. Postel, and Raphael Rom, *Addressing and Routing in a Local Wireless Network,* IEEE INFOCOM 1992, p. 5A.3.1-7.

Charles Perkins and David B. Johnson, *Mobility Support in IPv6,* Sep. 22, 1994, http//www.monarch.cs.rice.edu/internet-drafts/draft-perkins-ipv6-mobility-sup-00.txt (last visited Sep. 26, 2009.

Jonathan J. Hahn and David M. Stolle, *Packet Radio Network Routing Algorithms: A Survey,* IEEE Communications Magazine, vol. 22, No. 11, p. 41-7, Nov. 1984.

David A. Hall, *Tactical Internet System Architecture for the Task Force XXI,* IEEE 1996, p. 219-30.

Robert Hinden and Alan Sheltzer, *The DARPA Internet Gateway,* DARPA RFC 823, Sep. 1982, 45 pp.

Manuel Jimenez-Cedeno and Ramon Vasquez-Espinosa, *Centralized Packet Radio Network: A Communication Approach Suited for Data Collection in a Real-Time Flash Flood Prediction System,* Dept. of Electrical and Computer Engineering, University of Puerto Rico—Mayaguez, ACM 0-89791-568-2/93, p. 709-13, 1993.

David B. Johnson, *Routing in Ad Hoc Networks of Mobile Hosts,* Workshop on Mobile Computing Systems and Applications, Dec. 8-9, 1994, Santa Cruz, California, IEEE 1995, p. 158-63.

David B. Johnson, Route Optimization in Mobile IP, Nov. 28, 1994, http://www.monarch.cs.rice.edu/internet-drafts/draft-ietf-mobileip-optim-00.txt (last visited Sep. 26, 2009), 32 pp.

Mark G. Lewis and J.J. Garcia-Luna-Aceves, *Packet-Switching Applique for Tactical VHF Radios,* 1987 IEEE MILCOM Communciations Conference, Oct. 19-22, 1987, Washington, D.C., p. 21.2.1-7.

Sioe Mak and Denny Radford, *Design Considerations for Implementation of Large Scale Automatic Meter Reading Systems,* IEEE Transactions on Power Delivery, vol. 10, No. 1, p. 97-103, Jan. 1995.

Charles E. Perkins and Pravin Bhagwat, *A Mobile Networking System Based on Internet Protocol,* IEEE Personal Communications, First Quarter 1994, IEEE 1994, p. 32-41.

Richard Schulman, Richard Snyder, and Larry J. Williams, *SINCGARS Internet Controller—Heart of the Digitized Battlefield,*

Proceedings of the 1996 Tactical Communications Conference, Apr. 30-May 2, 1996, Fort Wayne, Indiana, p. 417-21.

Nachum Shacham and Earl J. Craighill, *Dynamic Routing for Real-Time Data Transport in Packet Radio Networks*, Proceedings of INFOCOM 1982, IEEE 1982, p. 152-58.

R. Lee Hamilton, Jr. and Hsien-Chuen Yu, *Optimal Routing in Multihop Packet Radio Networks*, IEEE 1990, p. 389-96.

Carl A. Sunshine, *Addressing Problems in Multi-Network Systems*, Proceedings of INFOCOM 1982, IEEE 1982, p. 12-18.

J.J. Garcia-Luna-Aceves, *Routing Management in Very Large-Scale Networks*, North-Holland, Future Generations Computer Systems 4, 1988, pp. 81-93.

J.J. Garcia-Luna-Aceves, *A Minimum-hop Routing Algorithm Based on Distributed Information*, North-Holland, Computer Networks and ISDN Systems 16, 1988/89, p. 367-382.

D. Hubner, J. Kassubek, F. Reichert, *A Distributed Multihop Protocol for Mobile Stations to Contact a Stationary Infrastructure*, Third IEE Conference on Telecommunications, Conference Publication No. 331, p. 204-7.

Jens Zander and Robert Forchheimer, *The SOFTNET Project: A Retrospect*, IEEE EUROCON, Jun. 13-17, 1988, p. 343-5.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-13.

Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE MILCOM 1984, Oct. 21-24, 1984, Conference Record vol. 2, p. 214-8.

Leis, John, "TCP/IP Protocol Family," pp. 1 and 42-43, Apr. 3, 2006.

Supplementary European Search Report for Application No. EP 08 85 1869, dated Dec. 30, 2010, 7 pp.

International Search Report for Application No. PCT/US10/26956, dated May 19, 2010, 2 pp.

Supplementary European Search Report for Application No. EP 08 85 1132, dated Dec. 6, 2010, 9 pp.

Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).

Levis Stanford University, J. P. Vasseur, Cisco Systems, et al., "Overview of Existing Routing Protocols for Low Power and Lossy Networks," draft-levis-r12n-overview-protocols-02.txt, IETF Standard-Working-Draft, Internet Engineering Task Force, IETF, Ch, No. 2, Nov. 17, 2007 (XP015054252) (ISSN: 0000-0004).

Culler Arch Rock, J.P. Vasseur, Cisco Systems, et al., "Routing Requirements for Low Power and Lossy Networks, draft-culler-r12n-routing-reqs-01.txt," IETF Standard-Working-Draft, Internet Engineering Task Force, IETF, CH, No. 1, Jul. 7, 2007 (XP015050851) (ISSN: 000-0004).

Perkins, C. E., et al., "Ad Hoc On-Demand Distance Vector (AODV) Routing," Network Working Group Internet Draft, XX, Nov. 9, 2001 (XP002950167).

Postel, J., "RFC 793 Transmission Control Protocol," Sep. 1981 [retrieved on Jan. 1, 2007], Retrieved From the Internet: http://www.ietf.org/rfc/rfc0793.txt.

Supplementary European Search Report for Application No. EP 08 85 1927, dated Dec. 22, 2010, 10 pp.

Younis, M., et al., "Energy-Aware Routing in Cluster-Based Sensor Networks," Modeling, Analysis and Simulation of Computer and Telecommunications Systems, $10^{th}$ IEEE Proceedings on Mascots, Oct. 11-16, 2002, Piscataway, NJ (XP010624424) (ISNB: 978-0-7695-1840-4).

Supplementary European Search Report for Application No. EP 08 85 3052, dated Mar. 18, 2011, 10 pp.

Supplementary European Search Report for Application No. EP 08 85 1560, dated Mar. 24, 2011, 9 pp.

Supplementary European Search Report for Application No. EP 08 85 2992, dated Mar. 23, 2011, 6 pp.

International Search Report and Written Opinion for Application No. PCT/US08/12161, dated Mar. 2, 2009, 13 pp.

International Search Report and Written Opinion for Application No. PCT/US08/13017, dated Mar. 18, 2009, 11 pp.

International Search Report and Written Opinion for Application No. PCT/US08/13032, dated May 12, 2009, 14 pp.

International Search Report and Written Opinion for Application No. PCT/US08/13026, dated Feb. 24, 2009, 9 pp.

International Search Report and Written Opinion for Application No. PCT/US08/13029, dated Feb. 2, 2009, 8 pp.

Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.

Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.

Katz, Randy H. and Brewer, Eric A., "The Case for Wireless Overlay Networks," *Electrical Engineering and Computer Science Department*, University of California, Berkeley, 12 pp., 1996.

Johnson, David B., "Routing in Ad Hoc Networks of Mobile Hosts," *IEEE*, pp. 158-163, 1995.

International Search Report and Written Opinion for Application No. PCT/US08/13027, dated Feb. 9, 2009, 6 pp.

International Search Report and Written Opinion for Application No. PCT/US08/13023, dated Jan. 12, 2009, 10 pp.

International Search Report and Written Opinion for Application No. PCT/US08/13019, dated Jan. 12, 2009, 13 pp.

International Search Report and Written Opinion for Application No. PCT/US08/13025, dated Jan. 13, 2009, 7 pp.

International Search Report and Written Opinion for Application No. PCT/US08/13018, dated Jan. 30, 2009, 9 pp.

International Search Report and Written Opinion for Application No. PCT/US08/13020, dated Jan. 9, 2009, 8 pp.

International Search Report and Written Opinion for Application No. PCT/US08/13028, dated Jan. 15, 2009, 9 pp.

International Search Report and Written Opinion for Application No. PCT/US08/13021, dated Jan. 15, 2009, 11 pp.

International Search Report and Written Opinion for Application No. PCT/US08/13016, dated Jan. 9, 2009, 7 pp.

International Search Report and Written Opinion for Application No. PCT/US08/13024, dated Jan. 13, 2009, 9 pp.

International Search Report and Written Opinion for Application No. PCT/US08/13022, dated Jan. 27, 2009, 10 pp.

International Search Report and Written Opinion for Application No. PCT/US08/13030, dated Jan. 9, 2009, 7 pp.

Reexamination Application No. 90/008,011, filed Jul. 24, 2006, 75 pp.

"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleID=X324101&CompanyId=3.

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.

"AMRON Meter Management System" [online], [retrieved on May 12, 2005], 41 pp., Retrieved from the Internet: http://www.amronm5.com/products/.

Hydro One Networks, Inc., Request for Proposal for Smart Metering Services, 16 pp., Mar. 4, 2005.

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.

Lee, David J. Y., "Ricocheting Bluetooth," 2nd International Conference on Microwave and Millimeter Wave Technology Proceedings, ICMMT 2000, pp. 432-435, 2000.

Lilja, Tore, "Mobile Energy Supervision," Twenty-second International Telecommunications Energy Conference, 2000 INTELEC, pp. 707-712, 2000.

Parkka, Juha, et al., "A Wireless Wellness Monitor for Personal Weight Management," Proceedings of the 2000 IEEE EMBS International Conference on Information Technology Applications in Biomedicine, pp. 83-88, 2000.

Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.

Privat, G., "A System-Architecture Viewpoint on Smart Networked Devices," Microelectronic Engineering, vol. 54, Nos. 1-2, pp. 193-197, Dec. 2000.

Jonsson, U., et al., "MIPMANET—Mobile IP for Mobile Ad Hoc Networks," MobiHOC 2000, First Annual Workshop on Mobile and Ad Hoc Networking and Computing, pp. 75-85 (12 pp. with Abstract), 2000.

Kapoor, R., et al., "Multimedia Support Over Bluetooth Piconets," First Workshop on Wireless Mobile Internet, pp. 50-55, Jul. 2001.

Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.

Lim, A., "Distributed Services for Information Dissemination in Self-Organizing Sensor Networks," Journal of the Franklin Institute, vol. 338, No. 6, pp. 707-727, Sep. 2001.

Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.

Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.

Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.

International Search Report and Written Opinion for Application No. PCT/US2011/060694, dated Apr. 9, 2012, 10 pp.

International Search Report and Written Opinion for Application No. PCT/US2011/049227, dated Jan. 31, 2012, 9 pp.

International Search Report and Written Opinion for Application No. PCT/US12/22334, dated Apr. 9, 2012, 9 pp.

International Search Report and Written Opinion for Application No. PCT/US11/56620, dated Mar. 13, 2012, 8 pp.

Supplementary European Search Report for Application No. EP 08 84 2449, dated Nov. 29, 2011, 5 pp.

Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.

Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.

Supplementary European Search Report for Application No. EP 09 81 1849, dated Dec. 13, 2011, 9 pp.

Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.

International Search Report and Written Opinion for Application No. PCT/US2011/049277, dated Jan. 31, 2012, 9 pp.

International Search Report and Written Opinion for Application No. PCT/US11/21167, dated Mar. 21, 2012, 8 pp.

"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.

"ZigBee Smart Energy Profile Specification," ZigBee Profile: 0x0109, Revision 15, Dec. 1, 2008, Document 075345r15 (SEP Document), 244 pp.

Edison Electric Institute (EEI), "Uniform Business Practices for Unbundled Electricity Metering, vol. Two," Dec. 5, 2000, 196 pp., www.naesb.org/pdf/ubp120500.pdf.

"ZigBee Smart Energy Profile Specification," ZigBee Profile: 0x0109, Revision 16, Version 1.1, Document 075356r16ZB, 332 pp., Mar. 23, 2011.

"ZigBee Over-the-Air Upgrading Cluster," ZigBee Alliance, Document 095264r18, Revision 18, Version 1.0, 63 pp., Mar. 14, 2010.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.

"ZigBee Cluster Library Specification," ZigBee Alliance, Document 075123r02ZB, 420 pp., May 29, 2008.

Liu, Ryan, et al., "A Survey of PEV Impacts on Electric Utilities," *EEE PES Innovative Smart Grid Technologies Conference*, Anaheim, California, 8 pp., Jan. 17-19, 2011.

"Utility/Lab Workshop on PV Technology and Systems," DTE Energy DER Technology Adoption, DEW Analysis of Renewable, PEV & Storage, Tempe, Arizona, 36 pp., Nov. 8-9, 2010.

"Network Device: Gateway Specification," ZigBee Alliance, ZigBee Document 075468r35, Revision 35, Version No. 1.0, 301 pp., Mar. 23, 2011.

* cited by examiner

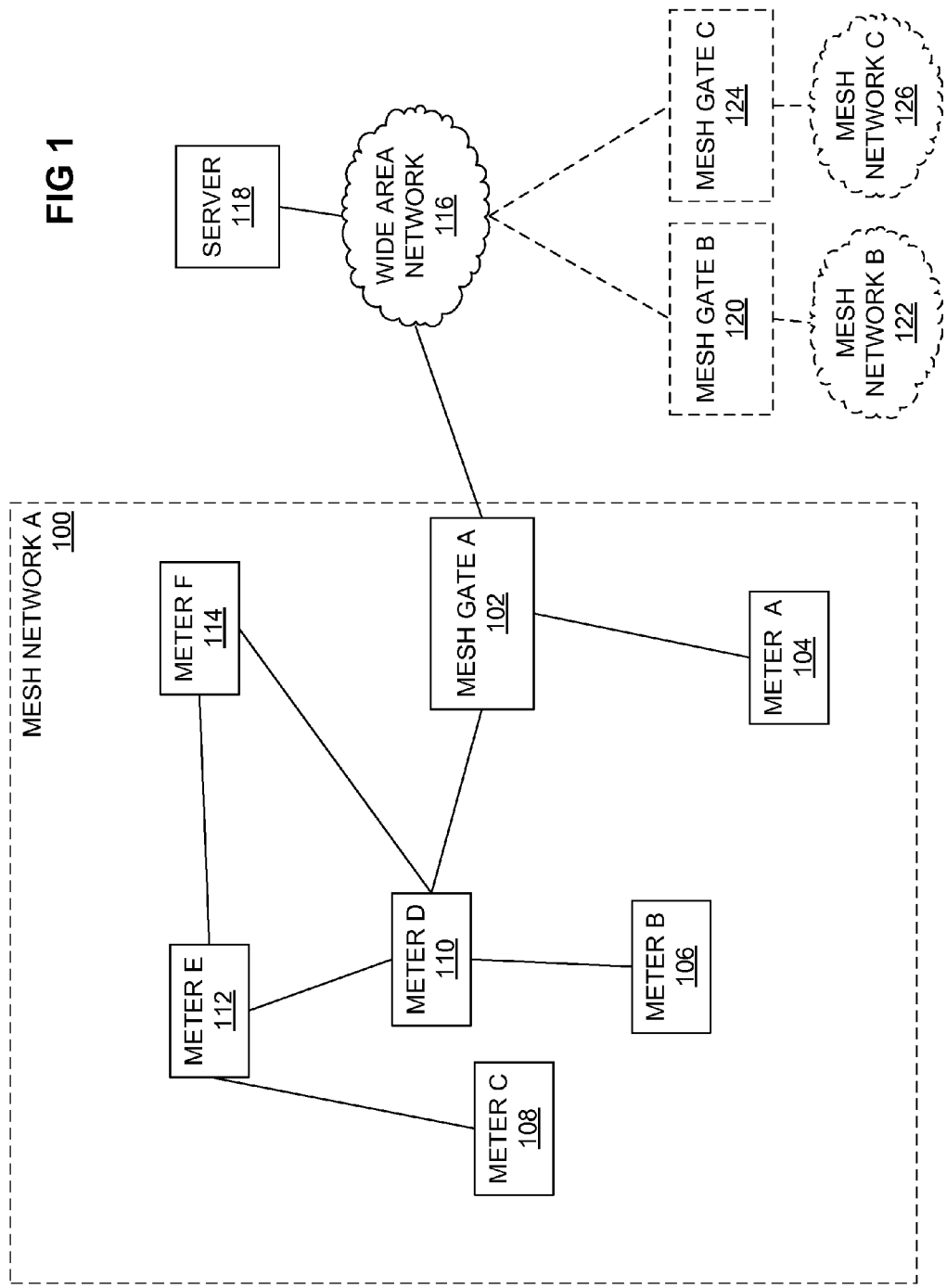

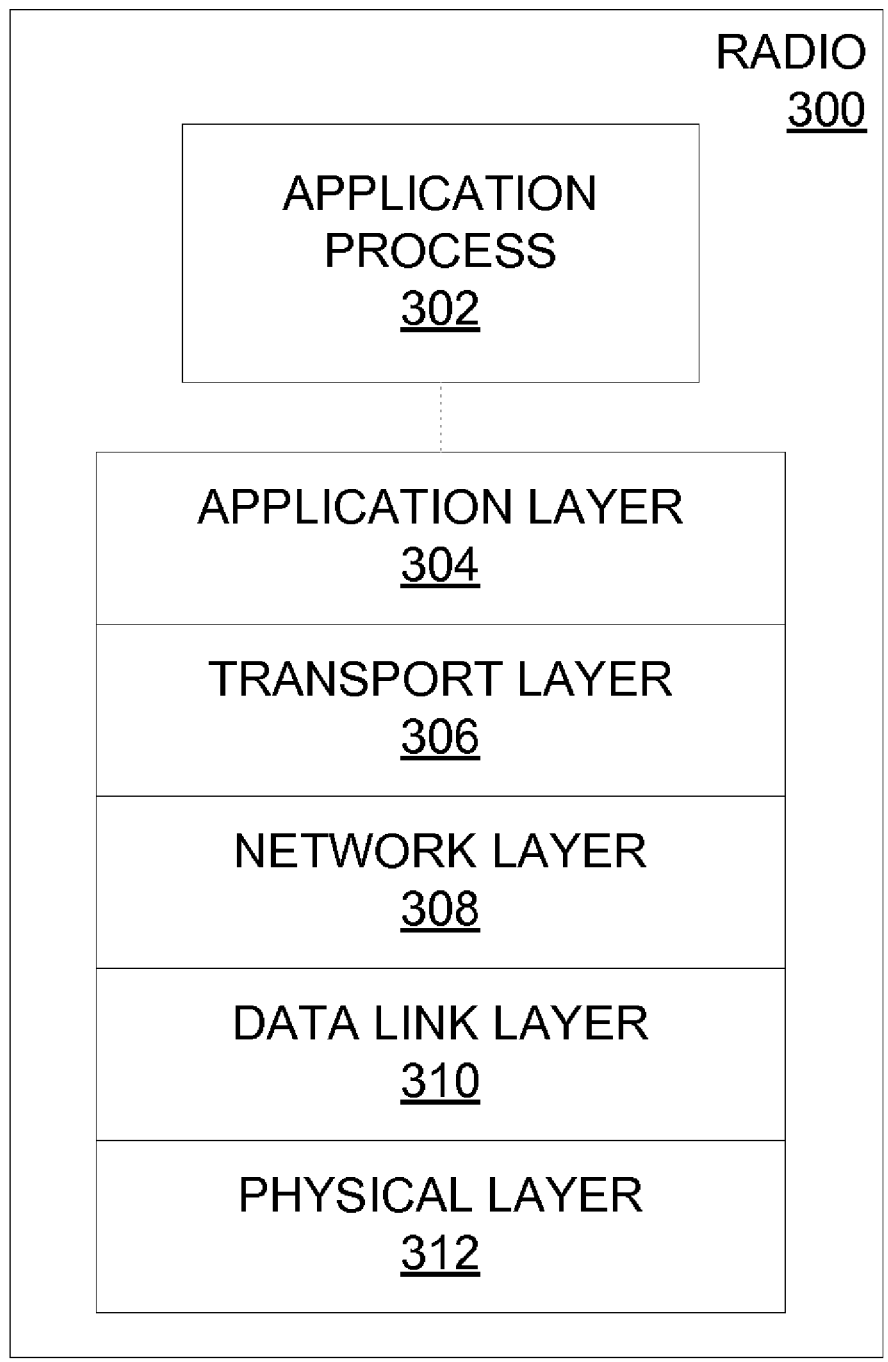

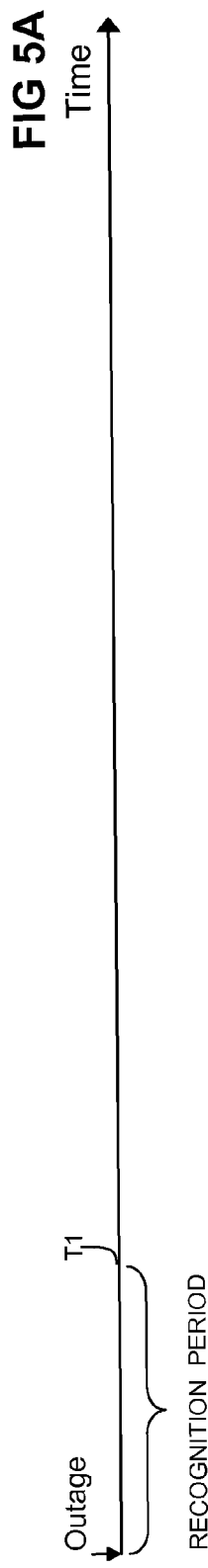
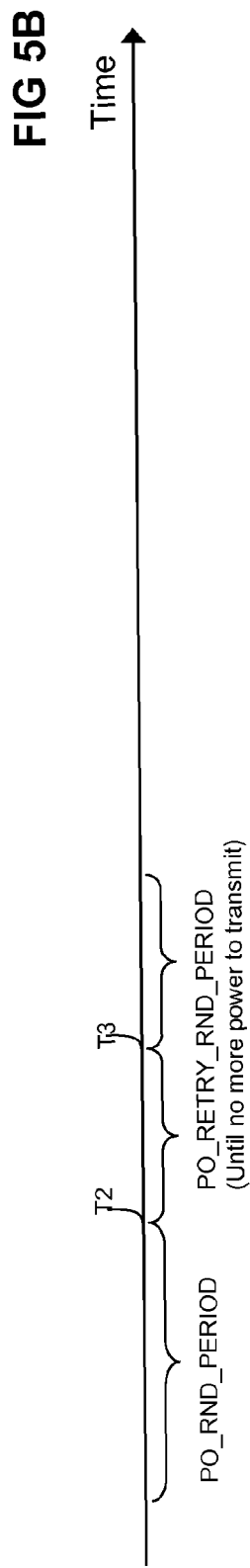
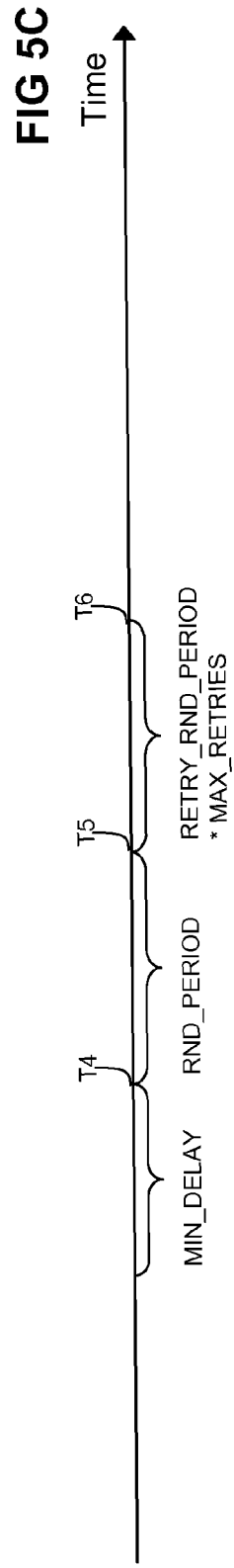
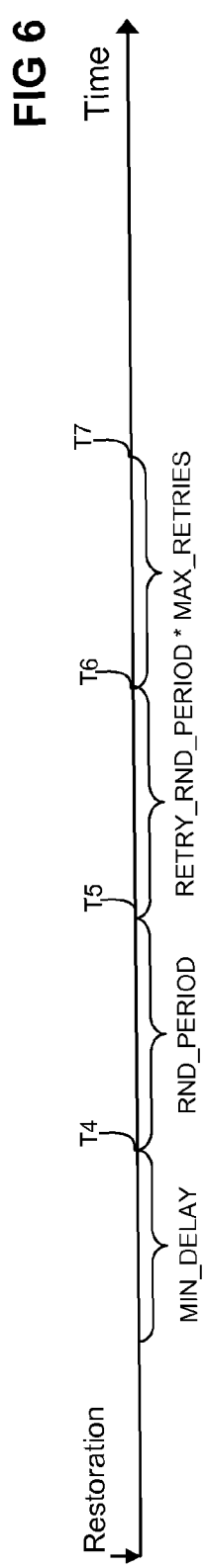

SYSTEM AND METHOD FOR POWER OUTAGE AND RESTORATION NOTIFICATION IN AN ADVANCED METERING INFRASTRUCTURE NETWORK

CROSS REFERENCE TO RELATED APPLICATIONS

This application is a continuation of U.S. application Ser. No. 12/275,254, filed Nov. 21, 2008, now U.S. Pat. No. 8,171,364, and claims the benefit of priority to the following United States provisional patent applications which are incorporated herein by reference in their entirety:

Ser. No. 60/989,957 entitled "Point-to-Point Communication within a Mesh Network", filed Nov. 25, 2007;

Ser. No. 60/989,967 entitled "Efficient And Compact Transport Layer And Model For An Advanced Metering Infrastructure (AMI) Network," filed Nov. 25, 2007;

Ser. No. 60/989,958 entitled "Creating And Managing A Mesh Network Including Network Association," filed Nov. 25, 2007;

Ser. No. 60/989,964 entitled "Route Optimization Within A Mesh Network," filed Nov. 25, 2007;

Ser. No. 60/989,950 entitled "Application Layer Device Agnostic Collector Utilizing ANSI C12.22," filed Nov. 25, 2007;

Ser. No. 60/989,953 entitled "System And Method For Real Time Event Report Generation Between Nodes And Head End Server In A Meter Reading Network Including From Smart And Dumb Meters," filed Nov. 25, 2007;

Ser. No. 60/989,956 entitled "System and Method for False Alert Filtering of Event Messages Within a Network", filed Nov. 25, 2007;

Ser. No. 60/989,975 entitled "System and Method for Network (Mesh) Layer And Application Layer Architecture And Processes," filed Nov. 25, 2007;

Ser. No. 60/989,959 entitled "Tree Routing Within a Mesh Network," filed Nov. 25, 2007;

Ser. No. 60/989,961 entitled "Source Routing Within a Mesh Network," filed Nov. 25, 2007;

Ser. No. 60/989,962 entitled "Creating and Managing a Mesh Network," filed Nov. 25, 2007;

Ser. No. 60/989,951 entitled "Network Node And Collector Architecture For Communicating Data And Method Of Communications," filed Nov. 25, 2007;

Ser. No. 60/989,955 entitled "System And Method For Recovering From Head End Data Loss And Data Collector Failure In An Automated Meter Reading Infrastructure," filed Nov. 25, 2007;

Ser. No. 60/989,952 entitled "System And Method For Assigning Checkpoints To A Plurality Of Network Nodes In Communication With A Device Agnostic Data Collector," filed Nov. 25, 2007;

Ser. No. 60/989,954 entitled "System And Method For Synchronizing Data In An Automated Meter Reading Infrastructure," filed Nov. 25, 2007;

Ser. No. 61/025,285 entitled "Outage and Restoration Notification within a Mesh Network", filed Jan. 31, 2008;

Ser. No. 60/992,312 entitled "Mesh Network Broadcast," filed Dec. 4, 2007;

Ser. No. 60/992,313 entitled "Multi Tree Mesh Networks", filed Dec. 4, 2007;

Ser. No. 60/992,315 entitled "Mesh Routing Within a Mesh Network," filed Dec. 4, 2007;

Ser. No. 61/025,279 entitled "Point-to-Point Communication within a Mesh Network", filed Jan. 31, 2008, and which are incorporated by reference.

Ser. No. 61/025,270 entitled "Application Layer Device Agnostic Collector Utilizing Standardized Utility Metering Protocol Such As ANSI C12.22," filed Jan. 31, 2008;

Ser. No. 61/025,276 entitled "System And Method For Real-Time Event Report Generation Between Nodes And Head End Server In A Meter Reading Network Including Form Smart And Dumb Meters," filed Jan. 31, 2008;

Ser. No. 61/025,282 entitled "Method And System for Creating And Managing Association And Balancing Of A Mesh Device In A Mesh Network," filed Jan. 31, 2008;

Ser. No. 61/025,271 entitled "Method And System for Creating And Managing Association And Balancing Of A Mesh Device In A Mesh Network," filed Jan. 31, 2008;

Ser. No. 61/025,287 entitled "System And Method For Operating Mesh Devices In Multi-Tree Overlapping Mesh Networks", filed Jan. 31, 2008;

Ser. No. 61/025,278 entitled "System And Method For Recovering From Head End Data Loss And Data Collector Failure In An Automated Meter Reading Infrastructure," filed Jan. 31, 2008;

Ser. No. 61/025,273 entitled "System And Method For Assigning Checkpoints to A Plurality Of Network Nodes In Communication With A Device-Agnostic Data Collector," filed Jan. 31, 2008;

Ser. No. 61/025,277 entitled "System And Method For Synchronizing Data In An Automated Meter Reading Infrastructure," filed Jan. 31, 2008;

Ser. No. 61/025,285 entitled "System and Method for Power Outage and Restoration Notification in An Automated Meter Reading Infrastructure," filed Jan. 31, 2008; and Ser. No. 61/094,116 entitled "Message Formats and Processes for Communication Across a Mesh Network," filed Sep. 4, 2008.

This application hereby references and incorporates by reference each of the following United States nonprovisional patent applications filed contemporaneously herewith:

Ser. No. 12/275,236 entitled "Point-to-Point Communication within a Mesh Network", filed Nov. 21, 2008;

Ser. No. 12/275,305 entitled "Efficient And Compact Transport Layer And Model For An Advanced Metering Infrastructure (AMI) Network," filed Nov. 21, 2008;

Ser. No. 12/275,238 entitled "Communication and Message Route Optimization and Messaging in a Mesh Network," filed Nov. 21, 2008;

Ser. No. 12/275,242 entitled "Collector Device and System Utilizing Standardized Utility Metering Protocol," filed Nov. 21, 2008;

Ser. No. 12/275,245 entitled "System and Method for False Alert Filtering of Event Messages Within a Network," filed Nov. 21, 2008;

Ser. No. 12/275,252 entitled "Method and System for Creating and Managing Association and Balancing of a Mesh Device in a Mesh Network," filed Nov. 21, 2008; and Ser. No. 12/275,257 entitled "System And Method For Operating Mesh Devices In Multi-Tree Overlapping Mesh Networks", filed Nov. 21, 2008.

FIELD OF THE INVENTION

This invention pertains generally to methods and systems for providing power outage and restoration notifications within an Advanced Metering Infrastructure (AMI) network.

BACKGROUND

A mesh network is a wireless network configured to route data between nodes within a network. It allows for continuous connections and reconfigurations around broken or blocked paths by retransmitting messages from node to node until a destination is reached. Mesh networks differ from other networks in that the component parts can all connect to each other via multiple hops. Thus, mesh networks are self-healing: the network remains operational when a node or a connection fails.

Advanced Metering Infrastructure (AMI) or Advanced Metering Management (AMM) are systems that measure, collect and analyze utility usage, from advanced devices such as electricity meters, gas meters, and water meters, through a network on request or a pre-defined schedule. This infrastructure includes hardware, software, communications, customer associated systems and meter data management software. The infrastructure allows collection and distribution of information to customers, suppliers, utility companies and service providers. This enables these businesses to either participate in, or provide, demand response solutions, products and services. Customers may alter energy usage patterns from normal consumption patterns in response to demand pricing. This improves system load and reliability.

A meter may be installed on a power line, gas line, or water line and wired into a power grid for power. During an outage, the meter may cease to function. When power is restored, meter functionality may be restored.

SUMMARY

A method and system provide power outage and restoration notifications within an AMI network. Mesh networks are used to connect meters of an AMI in a geographical area. Each meter may communicate with its neighbors via the mesh network. A mesh gate links the mesh network to a server over a wide area network (WAN). When a power outage occurs among the meters of a mesh network, leaf meters transmit outage messages first. Parent meters add a parent identifier before forwarding the outage messages. This reduces the number of transmitted outage messages within the mesh network. Similarly, restoration messages are transmitted from the leaf nodes first, while parent nodes piggy-back parent identifiers when forwarding the restoration messages from the leaf meters.

In one aspect, there is provided a system and method for power outage and restoration notification in an advanced metering infrastructure network.

In another aspect, there is provided a method of transmitting a meter power status, including: recognizing a power status change at a meter; if the meter is scheduled to transmit first, transmitting a notification message to at least one neighboring meter towards a mesh gate, wherein the notification message includes a power status indicator and a meter identifier; if the meter is not scheduled to transmit first, waiting a predetermined time period to receive a notification message from at least one neighboring meter; responsive to receiving a notification message, adding a meter identifier to the received notification message before retransmitting the modified notification message to at least one neighboring meter; and retransmitting the notification message.

In another aspect, there is provided a method of transmitting a network power status, including: receiving at least one notification message from a meter, wherein the notification message includes a power status indicator and at least one meter identifier; aggregating the received meter identifiers into a composite notification message, the composite notification message including a power status indicator and at least one meter identifier; transmitting the composite notification message to a server over a wide area network; and retransmitting the composite notification message.

In another aspect, there is provided a system for transmitting a network power status, including: (A) a mesh network; (B) a wide area network separate from the mesh network; (C) at least one meter in communication with the mesh network, the meter configured to: recognize a power status change at a meter, if the meter is scheduled to transmit first, transmit a notification message to at least one neighboring meter towards a mesh gate, wherein the notification message includes a power status indicator and a meter identifier, if the meter is not scheduled to transmit first, wait a predetermined time period to receive a notification message from at least one neighboring meter, responsive to receiving a notification message, adding a meter identifier to the received notification message before retransmitting the modified notification message to at least one neighboring meter, and retransmitting the notification message; (D) a mesh gate in communication with the meter over the mesh network and in communication with the wide area network, the mesh gate configured to: receive at least one notification message from a meter, wherein the notification messages include a power status indicator and at least one meter identifier, aggregate the received meter identifiers into a composite notification message, the composite notification message includes a power status indicator and at least one meter identifier, transmit the composite notification message to a server over a wide area network, and retransmitting the composite notification message; and (E) a server in communication with the mesh gate over the wide area network, the server configured to receive the composite notification message.

In another aspect, there is provided a system for transmitting a network power status, including: a mesh network; a wide area network separate from the mesh network; at least one meter in communication with the mesh network; a mesh gate in communication with the meter over the mesh network and in communication with the wide area network; and a server in communication with the mesh gate over the wide area network, the server configured to receive the composite notification message.

In another aspect, there is provided a computer program stored in a computer readable form for execution in a processor and a processor coupled memory to implement a method of transmitting a meter power status, the method including: recognizing a power status change at a meter; if the meter is scheduled to transmit first, transmitting a notification message to at least one neighboring meter towards a mesh gate, wherein the notification message includes a power status indicator and a meter identifier; if the meter is not scheduled to transmit first, waiting a predetermined time period to receive a notification message from at least one neighboring meter; responsive to receiving a notification message, adding a meter identifier to the received notification message before retransmitting the modified notification message to at least one neighboring meter; and retransmitting the notification message.

In another aspect, there is provided a computer program stored in a computer readable form for execution in a processor and a processor coupled memory to implement a method of transmitting a network power status, including: receiving at least one notification message from a meter, wherein the notification message includes a power status indicator and at least one meter identifier; aggregating the received meter identifiers into a composite notification message, the composite notification message including a power status indicator and at least one meter identifier; transmitting the composite notification message to a server over a wide area network; and retransmitting the composite notification message.

In another aspect, there is provided a method of transmitting a meter power status, including: recognizing a power status change at a meter; if the meter is scheduled to transmit first, transmitting a notification message from the meter to at least one neighboring meter towards a mesh gate, wherein the notification message includes a power status indicator and a meter identifier; if the meter is not scheduled to transmit first, waiting a predetermined time period to receive a notification message from at least one neighboring meter; responsive to receiving a notification message, adding a meter identifier to the received notification message before retransmitting the modified notification message to at least one neighboring meter, wherein the notification message includes a power status indicator and at least one meter identifier; aggregating the received meter identifiers into a composite notification message, the composite notification message including a power status indicator and at least one meter identifier; transmitting the composite notification message to a server over a wide area network; and retransmitting the composite notification message.

In another aspect, there is provided a computer program stored in a computer readable form for execution in a processor and a processor coupled memory to implement a method of transmitting a meter power status, the method including: recognizing a power status change at a meter; if the meter is scheduled to transmit first, transmitting a notification message from the meter to at least one neighboring meter towards a mesh gate, wherein the notification message includes a power status indicator and a meter identifier; if the meter is not scheduled to transmit first, waiting a predetermined time period to receive a notification message from at least one neighboring meter; responsive to receiving a notification message, adding a meter identifier to the received notification message before retransmitting the modified notification message to at least one neighboring meter, wherein the notification message includes a power status indicator and at least one meter identifier; aggregating the received meter identifiers into a composite notification message, the composite notification message including a power status indicator and at least one meter identifier; transmitting the composite notification message to a server over a wide area network; and retransmitting the composite notification message.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 illustrates an example system for providing AMI communications over a mesh network.

FIG. 3 illustrates an example network stack for use within a mesh radio.

FIG. 5A illustrates a first timing of transmitting outage notifications from a meter within a mesh network.

FIG. 5B illustrates a second timing of transmitting outage notifications from a meter within a mesh network.

FIG. 5C illustrates a third timing of transmitting outage notifications from a meter within a mesh network.

FIG. 6 illustrates a timing of transmitting restoration notifications from a meter within a mesh network.

DETAILED DESCRIPTION

Figure 2B:
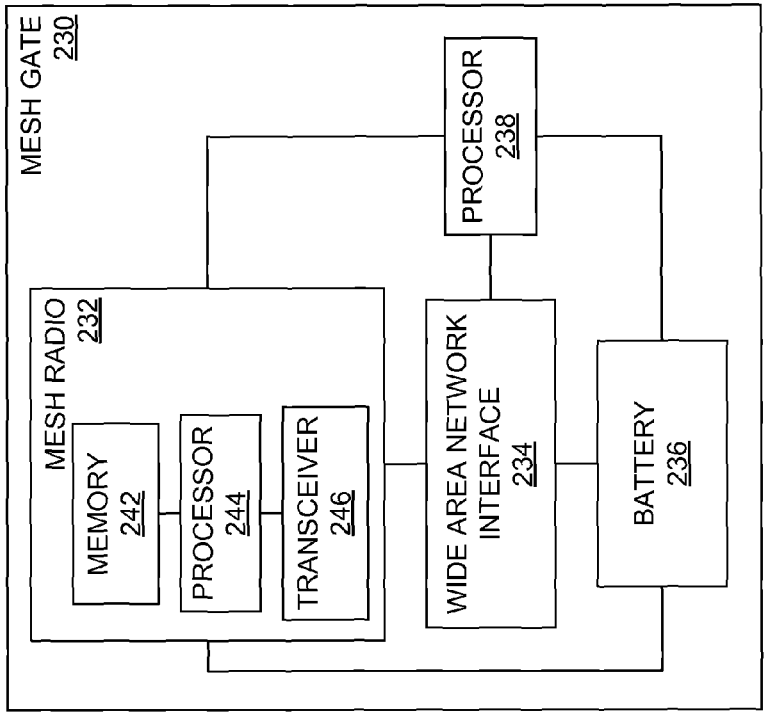
FIG. 2B illustrates an example mesh gate for use within a mesh network.

FIG. 1 illustrates an example system for providing AMI communications over a mesh network. A mesh network A 100 may include a mesh gate A 102 and a plurality of meters: meters A 104, B 106, C 108, D 110, E 112, and F 114. A mesh gate may also be referred to as a NAN-WAN gate or an access point. The mesh gate A 102 may communicate to a server 118 over a wide area network 116. Optionally, a mesh gate B 120 and a mesh network B 122 may also communicate with the server 118 over the wide area network (WAN) 116. Optionally, a mesh gate C 124 and a mesh network C 126 may also communicate with the server 118 over the wide area network 116.

In one example embodiment, the server 118 is known as a "head end." The mesh gate may also be known as a collector, a concentrator, or an access point.

It will be appreciated that a mesh device association can include a registration for application service at the mesh gate A 102 or the server 118. The mesh gate A 102 and the server 118 can maintain a table of available applications and services and requesting mesh devices.

The mesh network A 100 may include a plurality of mesh gates and meters which cover a geographical area. The meters may be part of an AMI system and communicate with the mesh gates over the mesh network. For example, the AMI system may monitor utilities usage, such as gas, water, or electricity usage and usage patterns.

The mesh gate A 102 may provide a gateway between the mesh network A 100 and a server, discussed below. The mesh gate A 102 may include a mesh radio to communicate with the mesh network A 100 and a WAN communication interface to communicate with a WAN.

The mesh gate A 102 may aggregate information from meters within the mesh network A 100 and transmit the information to the server. The mesh gate A 102 may be as depicted below. It will be appreciated that while only one mesh gate is depicted in the mesh network A 100, any number of mesh gates may be deployed within the mesh network A 100, for example, to improve transmission bandwidth to the server and provide redundancy. A typical system will include a plurality of mesh gates within the mesh network. In a non-limiting embodiment for an urban or metropolitan geographical area, there may be between 1 and 100 mesh gates, though this is not a limitation of the invention. In one embodiment, each mesh gate supports approximately 400 meters, depending on system requirements, wireless reception conditions, available bandwidth, and other considerations. It will be appreciated that it is preferable to limit meter usage of bandwidth to allow for future upgrades.

The meters A 104, B 106, C 108, D 110, E 112, and F 114 may each be a mesh device, such as a meter depicted below. The meters may be associated with the mesh network A 100 through direct or indirect communications with the mesh gate A 102. Each meter may forward or relay transmissions from other meters within the mesh network A 100 towards the mesh gate A. It will be appreciated that while only six meters are depicted in the mesh network A 100, any number of meters may be deployed to cover any number of utility lines or locations.

As depicted, only meters A 104 and D 110 are in direct communications with mesh gate A 102. However, meters B 106, E 112 and F 114 can all reach mesh gate A 102 through meter D 110. Similarly, meter C 108 can reach mesh gate A 102 through meter E 112 and meter D 110.

The wide area network (WAN) 116 may be any communication medium capable of transmitting digital information. For example, the WAN 116 may be the Internet, a cellular network, a private network, a phone line configured to carry a dial-up connection, or any other network.

The server 118 may be a computing device configured to receive information from a plurality of mesh networks and meters. The server 118 may also be configured to transmit instructions to the mesh networks, mesh gates, and meters.

It will be appreciated that while only one server is depicted, any number of servers may be used in the AMI system. For example, servers may be distributed by geographical location. Redundant servers may provide backup and failover capabilities in the AMI system.

The optional mesh gates B 120 and C 124 may be similar to mesh gate A 102, discussed above. Each mesh gate may be associated with a mesh network. For example, mesh gate B 120 may be associated with mesh network B 122 and mesh gate C 124 may be associated with mesh network C 126.

The mesh network B 122 and the mesh network C 126 may be similar to the mesh network A 102. Each mesh network may include a plurality of meters (not depicted).

Each mesh network may cover a geographical area, such as a premise, a residential building, an apartment building, or a residential block. Alternatively, the mesh network may include a utilities network and be configured to measure utilities flow at each sensor. Each mesh gate communicates with the server over the WAN, and thus the server may receive information from and control a large number of meters or mesh devices. Mesh devices may be located wherever they are needed, without the necessity of providing wired communications with the server.

Figure 2A:
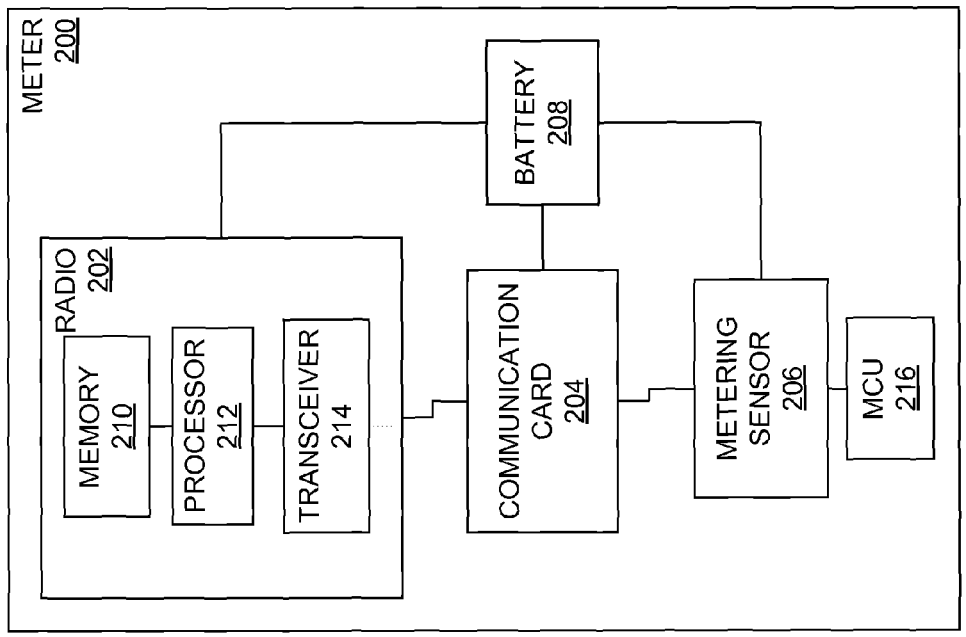
FIG. 2A illustrates an example meter for use within a mesh network.

FIG. 2A illustrates an example meter for use within a mesh network. A meter 200 may include a radio 202, a communication card 204, a metering sensor 206, and a battery or other power or energy storage device or source 208. The radio 202 may include a memory 210, a processor 212, a transceiver 214, and a microcontroller unit (MCU) 216 or other processor or processing logic.

A mesh device can be any device configured to participate as a node within a mesh network. An example mesh device is a mesh repeater, which can be a wired device configured to retransmit received mesh transmissions. This extends a range of a mesh network and provides mesh network functionality to mesh devices that enter sleep cycles.

The meter 200 may be a mesh device communicating with a mesh gate and other mesh devices over a mesh network. For example, the meter 200 may be a gas, water or electricity meter installed in a residential building or other location to monitor utilities usage. The meter 200 may also control access to utilities on server instructions, for example, by reducing the flow of gas, water or electricity.

The radio 202 may be a mesh radio configured to communicate with a mesh network. The radio 202 may transmit, receive, and forward messages to the mesh network. Any meter within the mesh network may thus communicate with any other meter or mesh gate by communicating with its neighbor and requesting a message be forwarded.

The communication card 204 may interface between the radio 202 and the sensor 206. Sensor readings may be converted to radio signals for transmission over the radio 202. The communication card 204 may include encryption/decryption or other security functions to protect the transmission. In addition, the communication card 204 may decode instructions received from the server.

The metering sensor 206 may be a gas, water, or electricity meter sensor, or another sensor. For example, digital flow sensors may be used to measure a quantity of utilities consumed within a residence or building. Alternatively, the sensor 206 may be an electricity meter configured to measure a quantity of electricity flowing over a power line.

The battery 208 may be configured to independently power the meter 200 during a power outage. For example, the battery 208 may be a large capacitor storing electricity to power the meter 200 for at least five minutes after a power outage. Small compact but high capacity capacitors known as super capacitors are known in the art and may advantageously be used. One exemplary super capacitor is the SESSCAP 50f 2.7v 18×30 mm capacitor. Alternative battery technologies may be used, for example, galvanic cells, electrolytic cells, fuel cells, flow cells, and voltaic cells.

It will be appreciated that the radio 202, communication card 204, metering sensor 206 and battery 208 may be modular and configured for easy removal and replacement. This facilitates component upgrading over a lifetime of the meter 200.

The memory 210 of the radio 202 may store instructions and run-time variables of the radio 202. For example, the memory 210 may include both volatile and non-volatile memory.

The memory 210 may also store a history of sensor readings from the metering sensor 206 and an incoming queue of server instructions.

The processor 212 of the radio 202 may execute instructions, for example, stored in memory 210. Instructions stored in memory 210 may be ordinary instructions, for example, provided at time of meter installation, or special instructions received from the server during run time.

The transceiver 214 of the radio 202 may transmit and receive wireless signals to a mesh network. The transceiver 214 may be configured to transmit sensor readings and status updates under control of the processor 212. The transceiver 214 may receive server instructions from a server, which are communicated to the memory 210 and the processor 212.

In the example of FIG. 2A, the MCU 216 can execute firmware or software required by the meter 200. The firmware or software can be installed at manufacture or via a mesh network over the radio 202.

In one embodiment, any number of MCUs can exist in the meter 200. For example, two MCUs can be installed, a first MCU for executing firmware handling communication protocols, and a second MCU for handling applications.

It will be appreciated that a mesh device and a mesh gate can share the architecture of meter 200. The radio 202 and the MCU 216 provide the necessary hardware, and the MCU 216 executes any necessary firmware or software.

Meters may be located in geographically dispersed locations within an AMI system. For example, a meter may be located near a gas line, an electric line, or a water line entering a building or premise to monitor a quantity of gas, electricity, or water. The meter may communicate with other meters and mesh gates through a mesh network. The meter may transmit meter readings and receive instructions via the mesh network.

FIG. 2B illustrates an example mesh gate for use within a mesh network. The mesh gate 230 may include a mesh radio 232, a wide area network interface 234, a battery 236, and a processor 238. The mesh radio 232 may include a memory 242, a processor 244, and a transceiver 246.

The mesh gate 230 may interface between mesh devices (for example, meters) in a mesh network and a server. For example, meters may be as discussed above. The mesh gate 230 may be installed in a central location relative to the meters and also communicate with a server over a WAN.

The mesh radio 232 may be a mesh radio configured to communicate with meters over a mesh network. The radio 232 may transmit, receive, and forward messages to the mesh network.

The WAN interface 234 may communicate with a server over a WAN. For example, the WAN may be a cellular network, a private network, a dial up connection, or any other network. The WAN interface 234 may include encryption/decryption or other security functions to protect data being transmitted to and from the server.

The battery 236 may be configured to independently power the mesh gate 230 during a power outage. For example, the battery 236 may be a large capacitor storing electricity to power the mesh gate 230 for at least five minutes after a power outage. A power outage notification process may be activated during a power outage.

The processor 238 may control the mesh radio 232 and the WAN interface 234. Meter information received from the meters over the mesh radio 232 may be compiled into composite messages for forwarding to the server. Server instructions may be received from the WAN interface 234 and forwarded to meters in the mesh network.

It will be appreciated that the mesh radio 232, WAN interface 234, battery 236, and processor 238 may be modular and configured for easy removal and replacement. This facilitates component upgrading over a lifetime of the mesh gate 230.

The memory 242 of the mesh radio 232 may store instructions and run-time variables of the mesh radio 232. For example, the memory 242 may include both volatile and non-volatile memory. The memory 242 may also store a history of meter communications and a queue of incoming server instructions. For example, meter communications may include past sensor readings and status updates.

The processor 244 of the mesh radio 232 may execute instructions, for example, stored in memory 242. Instructions stored in memory 242 may be ordinary instructions, for example, provided at time of mesh gate installation, or special instructions received from the server during run-time.

The transceiver 246 of the mesh radio 232 may transmit and receive wireless signals to a mesh network. The transceiver 246 may be configured to receive sensor readings and status updates from a plurality of meters in the mesh network. The transceiver 246 may also receive server instructions, which are communicated to the memory 242 and the processor 244.

A mesh gate may interface between a mesh network and a server. The mesh gate may communicate with meters in the mesh network and communicate with the server over a WAN network. By acting as a gateway, the mesh gate forwards information and instructions between the meters in its mesh network and the server.

FIG. 3 illustrates an example network stack for use within a mesh radio. A radio 300 may interface with an application process 302. The application process 302 may communicate with an application layer 304, which communicates with a transport layer 306, a network layer 308, a data link layer 310 and a physical layer 312.

The radio 300 may be a mesh radio as discussed above. For example, the radio 300 may be a component in a meter, a mesh gate, or any other mesh device configured to participate in a mesh network. The radio 300 may be configured to transmit wireless signals over a predetermined frequency to other radios.

The application process 302 may be an executing application that requires information to be communicated over the network stack. For example, the application process 302 may be software supporting an AMI system.

The application layer 304 interfaces directly with and performs common application services for application processes. Functionality includes semantic conversion between associated application processes. For example, the application layer 304 may be implemented as ANSI C12.12/22.

The transport layer 306 responds to service requests from the application layer 304 and issues service requests to the network layer 308. It delivers data to the appropriate application on the host computers. For example, the layer 306 may be implemented as TCP (Transmission Control Protocol), and UDP (User Datagram Protocol).

The network layer 308 is responsible for end to end (source to destination) packet delivery. The functionality of the layer 308 includes transferring variable length data sequences from a source to a destination via one or more networks while maintaining the quality of service, and error control functions. Data will be transmitted from its source to its destination, even if the transmission path involves multiple hops.

The data link layer 310 transfers data between adjacent network nodes in a network, wherein the data is in the form of packets. The layer 310 provides functionality including transferring data between network entities and error correction/detection. For example, the layer 310 may be implemented as IEEE 802.15.4.

The physical layer 312 may be the most basic network layer, transmitting bits over a data link connecting network nodes. No packet headers or trailers are included. The bit stream may be grouped into code words or symbols and converted to a physical signal, which is transmitted over a transmission medium, such as radio waves. The physical layer 312 provides an electrical, mechanical, and procedural interface to the transmission medium. For example, the layer 312 may be implemented as IEEE 802.15.4.

The network stack provides different levels of abstraction for programmers within an AMI system. Abstraction reduces a concept to only information which is relevant for a particular purpose. Thus, each level of the network stack may assume the functionality below it on the stack is implemented. This facilitates programming features and functionality for the AMI system.

Figure 4A:
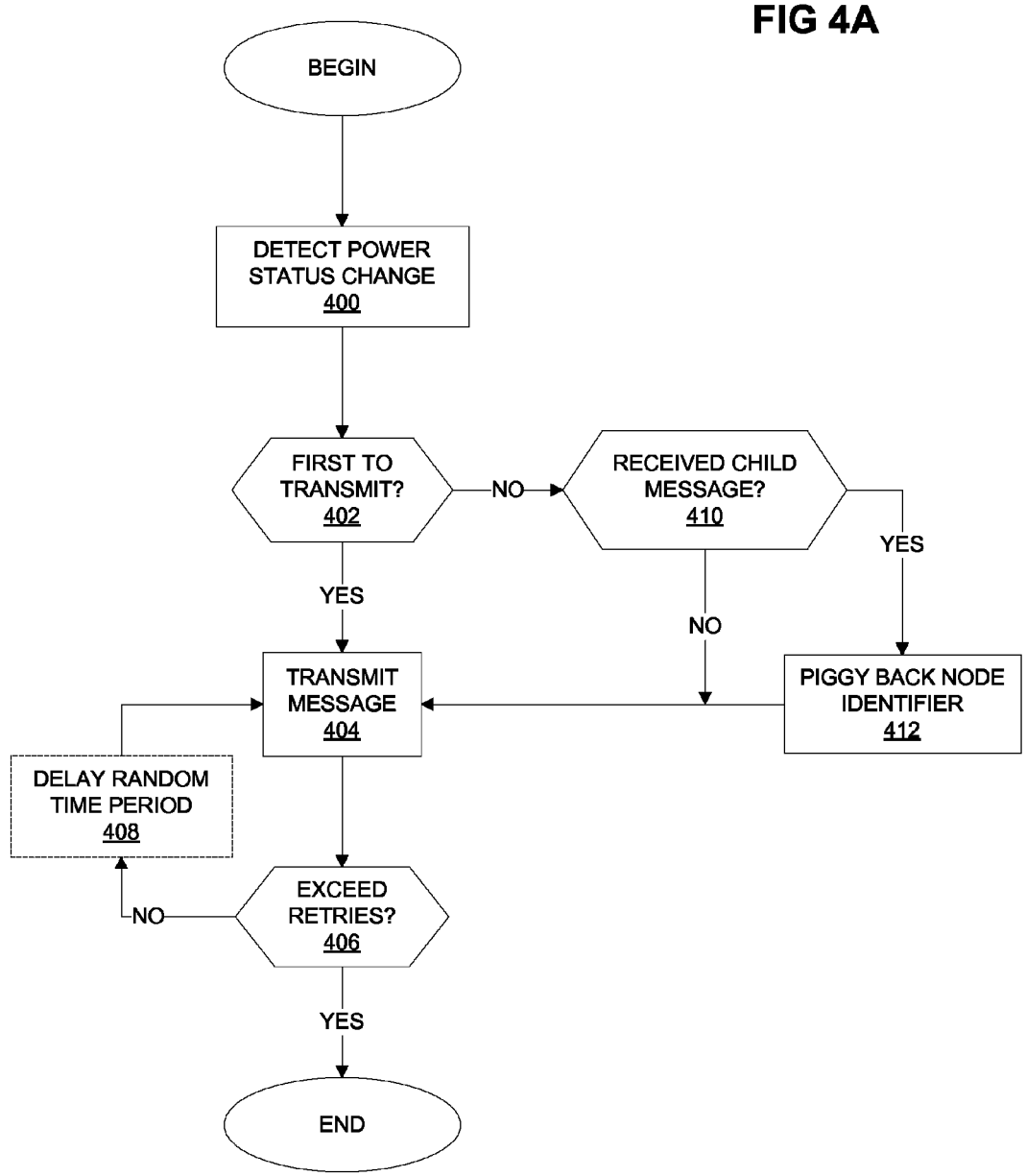
FIG. 4A illustrates an example procedure for transmitting outage and restoration notifications from a meter within a mesh network.

FIG. 4A illustrates an example procedure for transmitting outage and restoration notifications from a meter within a mesh network. A mesh device, such as a meter, may include a sensor for measuring utilities and receive power from a power grid. At times, the power grid may fail during a power outage. The power grid may also be restored after an outage. The meter may include a battery configured to power the meter for a period of time, during which the meter executes a power outage notification procedure to inform a mesh gate and a server of the power outage. Similarly, the meter may execute a power restoration notification when functionality is restored after power is restored to the power grid.

In 400, the meter may detect a power status change. For example, the meter may include an electric sensor sensing a power, current, or voltage of an electric line powering the meter from a power grid. When the sensor senses a cut-off in electricity, the meter may wait a predetermined recognition period before determining that a power outage has occurred.

When a meter's power is restored after an outage, the meter may also wait a predetermined recognition period before determining that the power outage has ended and power has been restored. Using a recognition period before an outage or a restoration has occurred prevents the meter from trigging the notification procedure for brief outages and restorations.

In 402, the meter tests whether it is the first to transmit. For example, the meter may look up a neighborhood table to determine whether it is a leaf meter. A leaf meter may have no children meters, and is thus the last meter on its associated branch. For example, FIG. 1 depicts meters A 104, B 106, C 108, and F 114 as leaf meters. Meter F 114 is a leaf meter because no child meter would transmit through it to reach mesh gate A 102, even though meter F 114 has two alternate paths to the mesh gate A 102 (F 114 to E 112 to D 110 to mesh gate or F 114 to D 110 to mesh gate).

A one-hop device, which can be a device in direct communications with the mesh gate, may transmit immediately.

Alternatively, the meter may look up the neighborhood table to determine a number of hops to the mesh gate. If it is farthest from the mesh gate on its branch, it will transmit first. If the meter determines yes, the meter proceeds to 404. If no, the meter proceeds to 410. The neighborhood table can be built during association requests and subsequent neighbor exchanges.

In 404, the meter may transmit a notification message. The notification message may include a nature of the notification (whether a power outage or restoration has occurred, as determined in 400) and a meter identifier. The meter identifier may be a globally unique identifier assigned to the meter at manufacture or installation that identifies the meter to the mesh gate and the server.

If the notification message has previously been transmitted, the meter may attempt a retry transmission. Retries may be attempted until an acknowledgement is received or a predetermined number of retry attempts has been exceeded.

Information transmitted in the transmission may include a device identifier, a time of outage, and any other necessary information. In one embodiment, a number of transmitted neighbor information may be restricted. For example, only a predetermined maximum number of parents, siblings, and children node information can be transmitted to limit message size. Neighbors can be selected based on a preferred route ratio. Neighbors that are on a preferred route of a meter's path to the mesh gate may be prioritized. The preferred route ratio can be used to select routes with a minimum of hops over a best minimum signal quality link to the mesh gate.

In 406, the meter may test whether it has exceeded a predetermined retry attempts. The meter may increment a counter for a number of retries after every attempt to transmit a notification message in 404. The predetermined retry attempts may be set to limit network congestion, both within the mesh network and over a WAN from a mesh gate to the server during a power outage and restoration.

Alternatively, the meter may continually attempt to transmit until its battery is drained during a power outage notification procedure. This may be used in an AMI system where it is important to receive as many accurate outage notifications as possible, or where network bandwidth is of lesser concern. If the predetermined retry attempts have been exceed, the procedure ends. If no, the meter procedures to 408.

In 408, the meter optionally delays a random time period. For example, the delay may allow other meters in the mesh network to transmit and reduce collisions. Further, the delay may improve battery life after a power outage.

The random time period may be associated with a predetermined floor value, below which it cannot be set. This may be an exclusion period during which no retransmission may be attempted by the meter.

In 410, the meter tests whether a child message has been received. For example, a non-leaf meter will not transmit during a first attempt, and may receive notification messages from child meters. If yes, the meter proceeds to 412. If no, the meter proceeds to 404. In one embodiment, if the meter determines it has missed the child messages, it may immediately transmit its message.

In 412, the meter may insert a meter identifier in the notification message. The notification message received from the child meter in 410 may include a status (whether the notification is for a power outage or restoration) and at least one meter identifier associated with children meters. The meter may insert its own identifier into the message before forwarding the message in 404.

By executing the procedure above, leaf meters transmit notification messages first. Each meter waits to receive a notification message from children meters before adding its identifier and forwarding the notification to its parent meter. This reduces message congestion in the mesh network during a notification procedure.

In an alternative example, each parent meter may determine how many children meters it has, and wait for notification messages from all children meters before compiling the messages into one message to be forwarded. Alternatively, the parent meter may wait for a predetermined period of time, because only some children meters may be affected by a power outage.

It will be appreciated that if a meter has not suffered a power outage, it would simply forward any received notification messages to its parent without adding its identifier into the message. Similarly, if a parent meter has not had a power restoration; it will remain off and be unable to forward notification messages. In this example, children meters may attempt alternative routes to transmit notification messages, as discussed below.

Figure 4B:
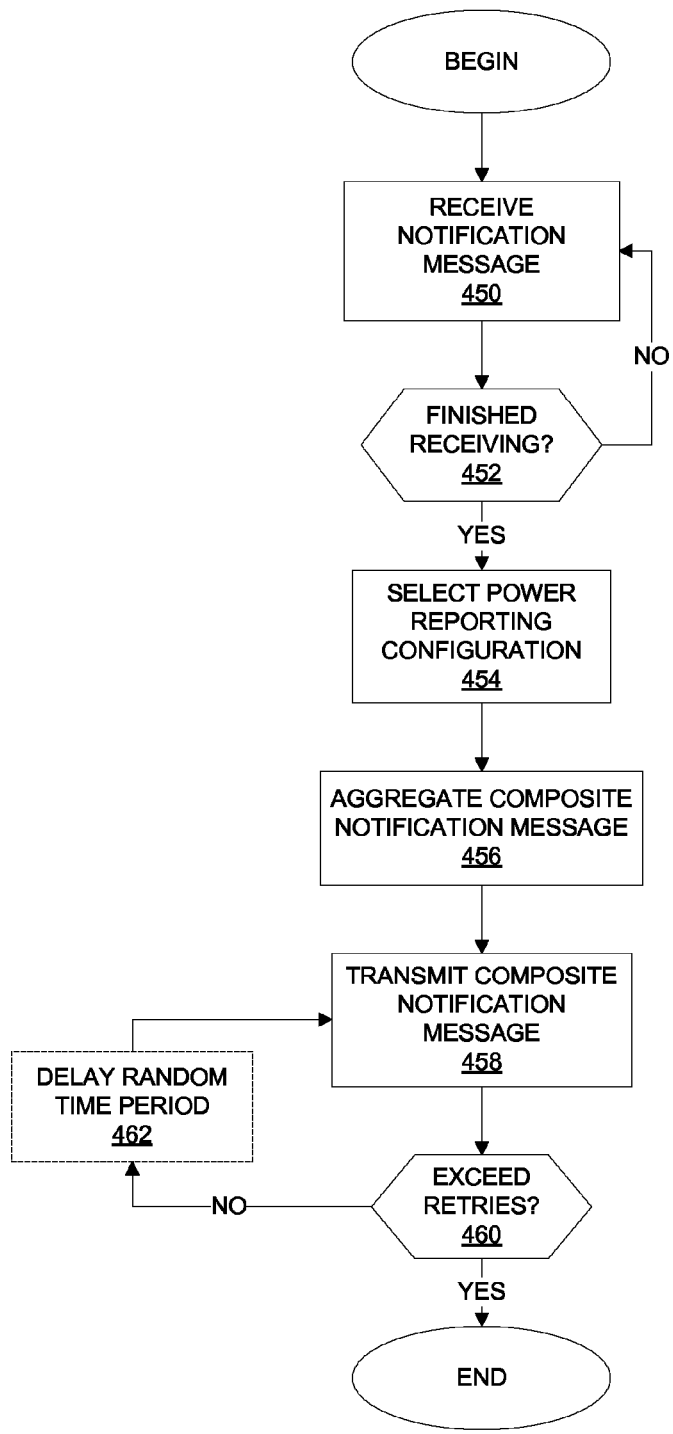
FIG. 4B illustrates an example procedure for transmitting outage and restoration notifications from a mesh gate within a wide area network.

FIG. 4B illustrates an example procedure for transmitting outage and restoration notifications from a mesh gate within a wide area network. A mesh gate and its associated mesh devices, such as meters, may receive power from a power grid. At times, the power grid may fail during a power outage. The power grid may also be restored after an outage. The mesh gate may include a battery configured to power the mesh gate for a period of time, during which the mesh gate executes a power outage notification procedure to inform a server of the outage and affected meters. Similarly, the mesh gate may execute a power restoration notification when power is restored to the power grid.

In 450, the mesh gate may receive a notification message from a meter within its mesh network. For example, the notification message may include a status indicating whether it is an outage or restoration notification and at least one meter identifier. The notification message may be as discussed above.

In 452, the mesh gate may test whether it has finished receiving notification messages from the mesh network. For example, the mesh gate may continually receive notification messages until its battery drops to a critical level during an outage. The critical level may be set to where enough power remains in the battery to allow the mesh gate to transmit its composite notification message to the server, as discussed below, along with a predetermined number of retries.

Alternatively, the mesh gate may wait for a predetermined time period after receiving a first notification message. For example, the predetermined time period may be determined, in part, based on the size of the mesh network, the maximum number of hops to reach a leaf meter, the link quality of the mesh network, etc.

Alternatively, the mesh gate may proceed as soon as message notifications from all children meters within the mesh network have been received. If all children meters are accounted for, the mesh gate does not need to wait for further notification messages.

If the mesh gate has finished receiving notification messages, it may proceed to 454. If no, it may proceed to 450 to await more notification messages.

In 454, the mesh gate may select a power reporting configuration. For example, two power reporting configurations may be available: one used for minor outage, such as one affecting only a few meters, and one used for major outages, such as one affecting many meters. The power reporting configuration may affect the retry attempts and delay periods discussed below.

For example, it may be very important to inform the server of a major outage. Thus, a high number of retry attempts may be set. It may be likely that a major outage has affected other mesh networks. Thus, a longer delay period may be used to reduce transmission collisions over the WAN. In addition, a longer window may be set to wait for notification messages from meters.

In 456, the mesh gate may aggregate all the notification messages into a composite notification message. For example, the mesh gate may create the composite notification message containing a status indicating whether an outage or restoration has occurred in the mesh network and a list of meter identifiers associated with the notification. For example, the list of meter identifiers may be received in 452 from one or more meters.

In one example, the mesh gate may receive both an outage and a restoration notification message. The mesh gate may aggregate a first notification message, for example, all received outage notification messages, for transmission. Then, the mesh gate may aggregate a second notification message, for example, the restoration notification message for transmission.

In 458, the mesh gate may transmit the composite notification message to the server over a WAN. For example, the WAN may be a cellular network, a wired network, or another network configured to carry information. In one example, the WAN used to transmit the composite notification message may be a secondary communications medium. A primary wired network may fail during a power outage, and therefore a backup network may be used. For example, the backup network may be a battery-powered network, cellular network, a battery-powered wired network, or another network configured to operate during an outage.

If the composite notification message has previously been transmitted, the mesh gate may attempt a retry transmission. Retries may be attempted until an acknowledgement is received or a predetermined number of retry attempts has been exceeded.

In 460, the mesh gate may test whether a predetermined number of retry attempts has been exceeded. The mesh gate may increment a counter for a number of retries after every attempt to transmit a notification message in 458. The predetermined retry attempts may be set to limit network congestion over the WAN to the server during a power outage and restoration.

Alternatively, the mesh gate may continually attempt to transmit until its battery is drained during a power outage notification procedure. This may be used in an AMI system where it is important to receive as many accurate outage notifications as possible, or where network bandwidth is of lesser concern.

For example, the predetermined number of retry attempts may be set in part based on the power reporting configuration selected in 454. If the predetermined number of retry attempts has been exceeded, the mesh gate may end the procedure. If no, the mesh gate may proceed to 462.

In 462, the mesh gate may optionally delay a random time period. For example, the delay may allow other mesh gates in the WAN to transmit and reduce collisions. Further, the delay may improve battery life after a power outage.

For example, the delay period may be set in part based on the power reporting configuration selected in 454. The random time period may be associated with a floor value, below which it cannot be set. This may be an exclusion period during which no retransmission may be attempted.

The mesh gate may aggregate all notification messages sent to it by meters over the mesh network. The composite notification message consists of a power status and a list of meter identifiers identifying the meters affected by the power status. The composite notification message may be transmitted over an outage-resistant communications link to a server.

FIG. 5A illustrates a first timing of transmitting outage notifications from a meter within a mesh network. A power outage notification process allows orderly transmission of power outage notification from one or more mesh devices (such as a meter) in a mesh network to a mesh gate. The mesh gate aggregates the notifications and transmits a composite message to a server. Because the mesh network may include a large number of meters, transmitting individual notifications from each meter may cause network congestion, especially because other meters within the mesh network are also likely affected by the same outage and will also be sending outage notifications.

A recognition period (e.g., RECOGNITION_PERIOD) may elapse between an occurrence of a power outage and time T1, when the power outage is recognized by the meter. The recognition period may prevent minor power fluctuations or outages from triggering the outage notification procedure.

FIG. 5B illustrates a second timing of transmitting outage notifications from a meter within a mesh network. The meter may wait for a first random period before a first attempt to send a power outage notification at time T2. A first attempt wait period (e.g., PO_RND_PERIOD) may represent a maximum random delay in seconds used before the first attempt. This random delay starts after recognition period (RECOGNITION_PERIOD) elapses at time T1. The first attempt is reserved for leaf meters. A meter which is not a leaf meter will not transmit during the first attempt.

The meter may wait for a retry random period before a retry attempt at time T3. A retry wait period (e.g., PO_RETRY_RND_PERIOD) may represent a maximum random delay in seconds used for each retry. This random delay starts after time T2, when a first transmission attempt occurs.

Using a random delay before the first and retry attempts prevents colliding transmission from multiple meters and reduces network congestion. If a meter attempts to transmit but a transmission is already in progress, the meter may wait for the transmission in progress to end before attempting to transmit.

If a meter receives a notification from a child meter, its transmission includes the child's notification plus the meter's identifier. By piggy-backing the meter's identifier in a child's notification and forwarding the notification, the number of individual notifications and messages are reduced in the mesh network.

The meter may continually retry to transmit an outage notification until the meter's battery is drained. In addition, there may be a predetermined maximum number retries. In addition, there may be a minimum period for the first delay and the subsequent retry delays. The minimum delay periods may eliminate the possibility of immediate retransmissions and guarantee a minimum delay between attempts.

The mesh gate may receive all the power outage notification messages and compile the information into a message for transmission to a server over a WAN. The mesh gate may also retransmit the compiled notification as necessary, until its battery is drained.

Child meters in a mesh network transmit outage notifications first, and parent meters piggy-back meter identifiers into the child notifications before forwarding the child notifications. A number of messages and notifications transmitted in the mesh network during an outage are thereby reduced.

FIG. 6 illustrates a timing of transmitting restoration notifications from a meter within a mesh network. A power restoration notification process allows orderly transmission of power restoration notification messages from one or more mesh devices (such as a meter) in a mesh network to a mesh gate. The mesh gate aggregates the notifications and transmits a composite message to a server. Because the mesh network may include a large number of meters, transmitting individual notifications from each meter may cause network congestion, especially because other meters within the mesh network are also likely affected by the restoration and will also be sending restoration notifications.

When power is restored at a meter, the meter may first wait for a recognition period before deciding the power has been restored. The recognition period may prevent triggering restoration notifications when power returns for a brief moment before the outage continues.

A first random period, PR_RND_PERIOD, may represent a maximum random delay used before a first attempt is made to send a power restoration notification. This first random period may begin after the power restored recognition period, PR_RECOGNITION_PERIOD. A first notification may be transmitted. Only leaf meters transmit during the first attempt.

A retry random period, PR_RETRY_RND_PERIOD, may represent a maximum random delay before a retry to send a power restoration notification. The retry random period begins after the first random period.

Using a random delay before the first and retry attempts reduces colliding transmission from multiple meters. If a meter attempts to transmit but a transmission is already in progress, the meter may wait for the transmission to end before attempting to transmit.

After the first attempt to transmit has been made, the mesh gate may wait a minimum delay (e.g., MIN_DELAY) to time T4 and an additional random period (e.g., RAND_PERIOD) to time T5 before retrying transmission. Each retry attempt may be preceded by a retry random period (e.g., RETRY_RND_PERIOD) to time T6, and a maximum number of retry attempts may be set at maximum retries (e.g., MAX_RETRIES). The procedure may stop at time T7, after all retry attempts have been made.

If a meter receives a notification from a child meter, its transmission includes the child's notification plus the meter's identifier. By piggy-backing the meter's identifier in a child's notification and forwarding the notification, the number of individual notifications and messages are reduced in the mesh network.

The mesh gate may receive all power restoration notification messages and compile the information into a composite message for transmission to a server over a WAN. Similarly, the mesh gate may also repeatedly attempt to transmit the composite restoration message until a maximum number of retries have been made or the server acknowledges the transmission.

Child meters in a mesh network transmit restoration notifications first, and parent meters piggy-back meter identifiers into the child notifications before forwarding the child notifications. A number of messages and notifications transmitted in the mesh network during a restoration are thereby reduced.

If a child meter attempts to forward a message to a parent meter that is not functional (for example, the parent meter's power has not been restored); the child meter may wait a predetermined period of time. If the parent meter remains non-functional, the child meter may attempt to send its notification via an alternative path through the mesh network stored in its memory. If that fails, the child meter may attempt to discover a new route through the mesh network to the mesh gate. If that fails, the child meter may attempt to associate with a new mesh network in order to transmit its restoration notification message.

Although the above embodiments have been discussed with reference to specific example embodiments, it will be evident that the various modification, combinations and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method of transmitting a meter power status, comprising:
   recognizing, by a meter, a power status change at the meter at a first time;
   waiting, by the meter, a predetermined recognition period from the first time to a second time;
   determining, by the meter, that the meter is not scheduled to transmit first;
   waiting, by the meter, a predetermined time period from the second time to a third time to receive a notification message from at least one neighboring meter including a meter identifier of the at least one neighboring meter;
   responsive to receiving the notification message from the neighboring meter, adding, by the meter, the meter identifier of the meter to the received notification message including the meter identifier of the at least one neighboring meter before retransmitting the received notification message to at least one other neighboring meter; and
   retransmitting, by the meter, the received notification message during a random time period from the third time to a fourth time.

2. The method of claim 1, wherein the power status change is at least one of: a power outage and a power restoration.

3. The method of claim 1, wherein the meter communicates with neighboring meters via a mesh network.

4. The method of claim 1, further comprising:
responsive to a first failure to receive an acknowledgement, retransmitting, by the meter, the notification message over an alternative mesh network path;
responsive to a second failure to receive an acknowledgement, retransmitting, by the meter, the notification message through a newly discovered mesh network path; and
responsive to a third failure to receive an acknowledgement, associating, by the meter, with a new mesh network and retransmitting the notification message over the new mesh network.

5. A system for transmitting a network power status, comprising:
(A) a mesh network;
(B) a wide area network separate from the mesh network;
(C) at least one meter in communication with the mesh network, the meter configured to:
recognize a power status change at a meter,
if the meter is scheduled to transmit first, transmit a notification message to at least one neighboring meter towards a mesh gate, wherein the notification message includes a power status indicator and a meter identifier of the meter,
if the meter is not scheduled to transmit first, wait a predetermined time period to receive a notification message from at least one neighboring meter including a meter identifier of the at least one neighboring meter,
responsive to receiving the notification message from the neighboring meter, adding the meter identifier of the meter to the received notification message from the neighboring meter before retransmitting the received notification message to at least one other neighboring meter, and
retransmitting the received notification message;
(D) a mesh gate in communication with the at least one meter over the mesh network and in communication with the wide area network, the mesh gate configured to:
receive at least one notification message from a meter, wherein each notification messages includes a power status indicator and at least one meter identifier,
aggregate received meter identifiers into a composite notification message, the composite notification message include a power status indicator and at least one meter identifier,
transmit the composite notification message to a server over a wide area network, and
retransmitting the composite notification message; and
(E) a server in communication with the mesh gate over the wide area network, the server configured to receive the composite notification message.

6. The system of claim 5, wherein the power status change is at least one of: a power outage and a power restoration.

7. The system of claim 5, wherein the meter is scheduled to transmit first if it has a high number of hops from the mesh gate.

8. The system of claim 5, wherein the meter is scheduled to transmit first if it is a leaf node in a mesh network.

9. The system of claim 5, wherein the mesh gate is further configured to select an isolated outage reporting configuration or a major outage reporting configuration, wherein the major outage reporting configuration includes a longer aggregation window.

10. The system of claim 5, wherein the mesh gate does not retransmit the composite notification message during an exclusion period.

11. A computer program stored in a non-transitory computer readable form for execution in a processor and a processor coupled memory to implement a method of transmitting a meter power status, the method comprising:
recognizing a power status change at a meter at a first time;
waiting a predetermined recognition period from the first time to a second time;
determining that the meter is not scheduled to transmit first;
waiting a predetermined time period from the second time to a third time to receive a notification message from at least one neighboring meter including a meter identifier of the at least one neighboring meter;
responsive to receiving the notification message from the neighboring meter, adding the meter identifier of the meter to the received notification message including the meter identifier of the at least one neighboring meter before retransmitting the received notification message to at least one other neighboring meter; and
retransmitting the received notification message during a random time period from the third time to a fourth time.

12. A method of transmitting a meter power status, comprising:
recognizing, by a meter, a power status change at the meter;
if the meter is scheduled to transmit first, transmitting, by the meter, a notification message from the meter to at least one neighboring meter towards a mesh gate, wherein the notification message includes a power status indicator and a meter identifier of the meter;
if the meter is not scheduled to transmit first, waiting, by the meter, a predetermined time period to receive a notification message from at least one neighboring meter including a meter identifier of the at least one neighboring meter;
responsive to receiving the notification message from the neighboring meter, adding, by the meter, the meter identifier of the meter to the received notification message including the meter identifier of the at least one neighboring meter before retransmitting the received notification message to at least one other neighboring meter;
aggregating, by a mesh gate, received meter identifiers into a composite notification message, the composite notification message including a power status indicator and at least one meter identifier;
transmitting, by the mesh gate, the composite notification message to a server over a wide area network; and
retransmitting, by the mesh gate, the composite notification message.

13. A computer program stored in a non-transitory computer readable form for execution in a processor and a processor coupled memory to implement a method transmitting a meter power status, the method comprising:
recognizing a power status change at a meter;
if the meter is scheduled to transmit first, transmitting a notification message from the meter to at least one neighboring meter towards a mesh gate, wherein the notification message includes a power status indicator and a meter identifier of the meter;
if the meter is not scheduled to transmit first, waiting a predetermined time period to receive a notification message from at least one neighboring meter;

responsive to receiving the notification message from the neighboring meter, adding the meter identifier of the meter to the received notification message before retransmitting the received notification message to at least one other neighboring meter;

selecting a power reporting configuration;

aggregating received meter identifiers into a composite notification message based on the selected power reporting configuration, the composite notification message including a power status indicator and at least one meter identifier;

transmitting the composite notification message to a server over a wide area network; and retransmitting the composite notification message.

14. A system for transmitting a network power status, comprising:
- (A) a mesh network;
- (B) a wide area network separate from the mesh network;
- (C) at least one meter in communication with the mesh network, the meter configured to:
    - recognize a power status change at a the meter at first time,
    - wait a predetermined recognition period from the first time to a second time;
    - determine that the meter is not scheduled to transmit first;
    - wait a predetermined time period from the second time to a third time to receive a notification message from at least one neighboring meter including a meter identifier of the at least one neighboring meter,
    - responsive to receiving the notification message from the neighboring meter, adding the meter identifier of the meter to the received notification message from the neighboring meter before retransmitting the received notification message to at least one other neighboring meter, and
    - retransmitting the received notification message during a random time period from the third time to a fourth time;
- (D) a mesh gate in communication with the at least one meter over the mesh network and in communication with the wide area network; and
- (E) a server in communication with the mesh gate over the wide area network.

\* \* \* \* \*